United States Patent
Denoual et al.

(10) Patent No.: US 10,348,846 B2
(45) Date of Patent: Jul. 9, 2019

(54) CLIENT-DRIVEN PUSH OF RESOURCES BY A SERVER DEVICE

(71) Applicant: CANON KABUSHIKI KAISHA, Tokyo (JP)

(72) Inventors: Franck Denoual, Saint Domineuc (FR); Youenn Fablet, La Dominelais (FR); Hervé Ruellan, Rennes (FR); Frédéric Maze, Langan (FR); Naël Ouedraogo, Maure de Bretagne (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/543,534

(22) PCT Filed: Jan. 15, 2016

(86) PCT No.: PCT/EP2016/050713
§ 371 (c)(1),
(2) Date: Jul. 13, 2017

(87) PCT Pub. No.: WO2016/120089
PCT Pub. Date: Aug. 4, 2016

(65) Prior Publication Data
US 2018/0013845 A1    Jan. 11, 2018

(30) Foreign Application Priority Data
Jan. 28, 2015 (GB) .................................. 1501437.6

(51) Int. Cl.
| | | |
|---|---|---|
| G06F 13/00 | (2006.01) | |
| H04L 29/08 | (2006.01) | |
| H04L 29/06 | (2006.01) | |
| H04L 12/911 | (2013.01) | |

(52) U.S. Cl.
CPC .............. *H04L 67/26* (2013.01); *H04L 47/70* (2013.01); *H04L 65/4084* (2013.01);
(Continued)

(58) Field of Classification Search
CPC ..... H04L 67/26; H04L 65/4084; H04L 67/02; H04L 67/42; H04L 69/22; H04L 47/70; H04L 65/4069
(Continued)

(56) References Cited

U.S. PATENT DOCUMENTS 8,959,190 B2 * 2/2015 Kiley ................ G06F 17/30867
709/220
10,104,190 B2 * 10/2018 Fablet .................. H04L 65/4084
(Continued)

FOREIGN PATENT DOCUMENTS

| | | |
|---|---|---|
| GB | 2516112 A | 1/2015 |
| WO | 2015/004276 A2 | 1/2015 |

OTHER PUBLICATIONS

Tang, et al., "Intelligent browser initiated server pushing", Performance, Computing, and Communications Conference, 2000. IPCCC '00 . Conference Proceed i ng of the IEEE International Phoenix, AZ, USA Feb. 20-22, 2000, Piscataway, NJ, USA, IEEE, US, Feb. 20, 2000, p. 17-23, XP010500004, DOI: 10.1109/PCCC.2000. 830296 ISBN: 978-0-7803-5979-6, p. 17, right-hand column, line 1—p. 20, paragraph 3.3.

(Continued)

*Primary Examiner* — Kenneth R Coulter
(74) *Attorney, Agent, or Firm* — Canon U.S.A., Inc. I.P. Division

(57) ABSTRACT

The present invention relates to data transmission over HTTP communication networks, for instance data streaming. A method of transmitting data between a server and a client, comprises, at the server: receiving, from the client, an HTTP request to obtain first data, wherein the HTTP request includes first data identifying information allowing identification of the first data on the server and includes one or more additional header fields containing an indication relating to pushing second data; retrieving and sending the first data to the client; and sending acknowledgment data to the client device, the acknowledgment data being representative of the indication relating to pushing second data.

23 Claims, 20 Drawing Sheets

(52) U.S. Cl.
CPC .............. *H04L 67/02* (2013.01); *H04L 67/42* (2013.01); *H04L 69/22* (2013.01); *H04L 65/4069* (2013.01)

(58) Field of Classification Search
USPC ......... 709/203, 245, 217–219, 227–229, 230
See application file for complete search history.

(56) References Cited

U.S. PATENT DOCUMENTS

| | | | | |
|---|---|---|---|---|
| 2003/0233329 | A1* | 12/2003 | Laraki | G06Q 20/123 705/52 |
| 2012/0198328 | A1* | 8/2012 | Kiley | G06F 17/30867 715/234 |
| 2016/0198012 | A1* | 7/2016 | Fablet | H04L 65/4084 709/231 |
| 2017/0171287 | A1* | 6/2017 | Famaey | H04L 65/4084 |
| 2017/0230442 | A1* | 8/2017 | Denoual | H04L 67/26 |
| 2018/0359328 | A1* | 12/2018 | Fablet | H04L 65/4084 |

OTHER PUBLICATIONS

Twist, et al., "Hypertext Transfer Protocol version 2.0; draft-unicorn-httpbis-http2-00.txt", Hypertext Transfer Protocol Version 2.0; Draft-Unicorn-httpbis-http2-00.Txt, Internet Engineering Task Force, IETF; Standardworkingdraft, Internet Society (ISOC) 4, Rue Des Falaises Ch—1205 Geneva, Switzerland, Jul. 2, 2013, p. 1-52, XP015094729, [retrieved on Jul. 2, 2017] p. 27, line 1-line 8 p. 28, line 1-line 38 p. 41, paragraph 4.2—p. 42, line bottom.

* cited by examiner

```
<!-- MPD file Generated with GPAC version 0.5.1-DEV-rev4199 -->
<MPD type="static" minBufferTime="PT1.5S" mediaPresentationDuration="PT0H10M0.00S"
profiles="urn:mpeg:dash:profile:isoff-live:2011">
 <ProgramInformation moreInformationURL="http://gpac.sourceforge.net">
  <Title>mp4-live-mpd-V-BS.mpd generated by GPAC</Title>
  <Copyright>TelecomParisTech 2012</Copyright>
 </ProgramInformation>
 <Period start="PT0S" duration="PT0H10M0.00S">
  <AdaptationSet segmentAlignment="true" bitstreamSwitching="true" maxWidth="1920" maxHeight="1080"
  maxFrameRate="25" par="16:9">
   <ContentComponent id="1" contentType="video"/>
   <SegmentTemplate timescale="10000" duration="1000" media="mp4-live-$RepresentationID$-
   $Number$.m4s" startNumber="1" initialization="mp4-live-mpd-V-BS_init.mp4"/>
   <Representation id="h264bl_low" mimeType="video/mp4" codecs="avc1.42c01e" width="640" height="360"
   frameRate="25" startWithSAP="1" bandwidth="194834">
   </Representation>
   <Representation id="h264bl_full" mimeType="video/mp4" codecs="avc1.42c028" width="1920" height="1080"
   frameRate="25" startWithSAP="1" bandwidth="770663">
   </Representation>
  </AdaptationSet>
 </Period>
</MPD>
```

Fig. 7a

```
<?xml version="1.0"?>
<!-- MPD file Generated with GPAC version 0.5.1-DEV-rev4199 -->
<MPD type="static" xmlns="urn:mpeg:dash:schema:mpd:2011" minBufferTime="PT1.5S"
mediaPresentationDuration="PT0H10M0.00S" profiles="urn:mpeg:dash:profile:isoff-main:2011">
  <ProgramInformation moreInformationURL="http://gpac.sourceforge.net">
    <Title>mp4-main-multi-mpd-V-NBS.mpd generated by GPAC</Title>
    <Copyright>TelecomParisTech(c)2012</Copyright>
  </ProgramInformation>
  <Period start="PT0S" duration="PT0H01M0.00S">
    <AdaptationSet segmentAlignment="true" maxWidth="1920" maxHeight="1080" maxFrameRate="25"
par="16:9">  <ContentComponent id="1" contentType="video"
@templateURI="mp4-main-multi-h264bl_{level}-{nb}.m4s"/>
      <Representation id="h264bl_low" mimeType="video/mp4" codecs="avc1.42c00d" width="320" height="180"
frameRate="25" startWithSAP="1" bandwidth="50877"
        @templateURI="mp4-main-multi-h264bl_low-{nb}.m4s" >
        <SegmentList timescale="1000" duration="10000" >
          <Initialization sourceURL="mp4-main-multi-h264bl_low-.mp4"/>
          <SegmentURL media="mp4-main-multi-h264bl_low-1.m4s"/>
          <SegmentURL media="mp4-main-multi-h264bl_low-2.m4s"/>
          <SegmentURL media="mp4-main-multi-h264bl_low-3.m4s"/>
          <SegmentURL media="mp4-main-multi-h264bl_low-4.m4s"/>
          <SegmentURL media="mp4-main-multi-h264bl_low-5.m4s"/>
          <SegmentURL media="mp4-main-multi-h264bl_low-6.m4s"/>
        </SegmentList>
      </Representation>
      <Representation id="h264bl_hd" mimeType="video/mp4" codecs="avc1.42c01f" width="1280" height="720"
frameRate="25" startWithSAP="1" bandwidth="514828"
        @templateURI="mp4-main-multi-h264bl_hd-{nb}.m4s" >
        <SegmentList timescale="1000" duration="10000" >
          <Initialization sourceURL="mp4-main-multi-h264bl_hd-.mp4"/>
          <SegmentURL media="mp4-main-multi-h264bl_hd-1.m4s"/>
          <SegmentURL media="mp4-main-multi-h264bl_hd-2.m4s"/>
          <SegmentURL media="mp4-main-multi-h264bl_hd-3.m4s"/>
          <SegmentURL media="mp4-main-multi-h264bl_hd-4.m4s"/>
          <SegmentURL media="mp4-main-multi-h264bl_hd-5.m4s"/>
          <SegmentURL media="mp4-main-multi-h264bl_hd-6.m4s"/>
        </SegmentList>
      </Representation>
    </AdaptationSet>
  </Period>
</MPD>
```

Fig. 10

CLIENT-DRIVEN PUSH OF RESOURCES BY A SERVER DEVICE

CROSS REFERENCE TO RELATED APPLICATIONS

This application is a national phase application of PCT application no. PCT/EP2016/050713 filed on Jan. 15, 2016 and which claims the benefit under 35 U.S.C. § 119(a)-(d) of United Kingdom Patent Application No. 1501437.6 filed on Jan. 28, 2015 and of United Kingdom Patent Application No. 1509094.7 filed on May 27, 2015. The above cited patent applications are incorporated herein by reference in their entirety.

FIELD OF THE INVENTION

The present invention relates to data transmission over HTTP (standing for HyperText Transfer Protocol) communication networks, for instance data streaming, and more precisely to client-driven push of resources by a server device.

BACKGROUND OF THE INVENTION

In communications over HTTP, such as DASH (acronym for Dynamic Adaptive Streaming over HTTP) media content streaming, a high amount of data may be requested by a client device to a server device. To do so, the client device usually sends HTTP requests that each includes a request line made of a method (for instance "GET") and a uniform resource identifiers, URI, identifying and locating, possibly together with one or more additional headers in the HTTP request (for instance a Range header that provides a byte range within the resource identified by the URI), the requested data on the server device.

A server Push feature has been developed to make it possible for the server device to voluntary push data not yet requested by the client device. This is a useful feature for decreasing web resource load time.

The server Push feature has been introduced in HTTP/2 (which also makes it possible to exchange several requests/responses, i.e. to have several streams, within single existing connection) for allowing server devices to send unsolicited web resource representations to client devices. Web resources such as web pages generally contain links to other resources, which themselves may contain links to other resources. To fully display a web page, all the linked and sub-linked resources generally need to be retrieved by the client device. This incremental discovery may lead to a slow display of a web page, especially on high latency networks such as mobile networks.

When receiving a request for a given web page, the server device is able to determine which other resources are needed for the full processing of the requested resource. By sending the requested resource and the linked resources at the same time, the server device allows reducing the load time of the web page. Thus, using the push feature, the server device may send additional resource representations at the time it is requested a given resource.

The push of data has also been suggested in the context of DASH, for instance in the Applicant's application published under WO 2015/004276.

This publication seeks to enhance data streaming, especially in the context of DASH-based communications, to optimize user experience. This is because, in conventional mechanisms, the client and server devices may not know if the promised data will be transmitted and received at the desired time: the client device may not know when and in which order the video segments will be sent. Also, the promised data pushed or announced by the server device may mismatch the client device's needs (which may evolve over time), thus leading to resource wasting in particular at the server end. Publication WO 2015/004276 thus suggests sharing a push policy between the server device and the client device.

This sharing helps the client device to know in advance which data are about to be pushed, and then to prepare cancellation of such pushes to avoid wasting network bandwidth.

However, the mechanisms proposed in this publication require that the server device has sophisticated knowledge of DASH, in particular to be able to apply the push policy on the XML-based DASH "media presentation description" files (MPD) to determine which data or resource to push according to the push policy.

It is reminded that a MPD file describes the structure of media contents into media segments. The MPD file is exchanged between the server device and the client device, providing the later with information allowing it to control the delivery of media contents, i.e. to individually request each media segment.

SUMMARY OF THE INVENTION

In this context, the present invention provides a method of transmitting data between a server device and a client device, comprising the following steps, at the server device:

receiving, from the client device, an HTTP request to obtain first data, wherein the HTTP request includes first data identifying information allowing identification of the first data on the server device and includes one or more additional header fields containing an indication relating to pushing second data;

retrieving and sending the first data to the client device;

sending acknowledgment data to the client device, the acknowledgment data being representative of the indication relating to pushing second data, and determining second data identifying information allowing identification of the second data on the server device, using only the one or more additional header fields and possibly the first data identifying information.

Accordingly, the method of the invention makes it possible for a client device to adapt its behaviour in view of the push policy applied by the server device.

In embodiments, the method further comprises:

sending a push promise message to announce the push of the second data to the client device and/or pushing the second data to the client device.

In embodiments, the acknowledgment data are representative of an indication for pushing the second data.

In embodiments, the acknowledgment data indicate that no second data will be pushed in response to the HTTP request.

In embodiments, the indication relating to pushing second data comprises a list including at least two different indications relating to pushing second data.

In embodiments, the acknowledgment data comprise one of the at least two different indications relating to pushing second data, the one of the at least two different indications relating to pushing second data being used to identify the second data to be pushed to the client device.

In embodiments, the indication relating to pushing second data is associated with a type of data of the second data, the type of data comprising a description data type or a content data type, the second data belonging to content data or to description data.

In embodiments, the indication relating to pushing second data is directed to pushing media presentation description updates.

In embodiments, the acknowledgment data contain an indication relating to pushing second data, the indication relating to pushing second data within the acknowledgment data being different than the indication relating to pushing second data within the HTTP request.

In embodiments, the indication relating to pushing second data comprises at least one unique identifier, the at least one unique identifier being representative of directives for pushing second data and of identification of the second data to be pushed or being representative of directives for not pushing second data.

In embodiments, the unique identifier is defined in a centralized repository.

In embodiments, the unique identifier is set as a function of at least one parameter.

According to another object of the invention, there is provided a method of transmitting data between a server device and a client device, comprising the following steps, at the client device:

identifying data to be obtained from the server device;

generating an HTTP request to obtain first data from the identified data, wherein the HTTP request includes first data identifying information allowing identification of the first data on the server device and includes one or more additional header fields containing an indication for the server device to push second data or not to push second data;

sending the HTTP request to the server device to obtain the first data and to drive the server device to push or not second data; and in response to sending the HTTP request, receiving acknowledgment data from the server device, the acknowledgment data being representative of the indication relating to pushing second data, wherein the one or more additional header fields define, based only on the one or more additional header fields and possibly on the first data identifying information, second data identifying information allowing identification of second data from the identified data on the server device.

Accordingly, the method of the invention makes it possible for a client device to adapt its behaviour in view of the push policy plied by the server device.

In embodiments, the acknowledgment data are representative of an indication for pushing the second data.

In embodiments, the acknowledgment data indicate that no second data will be pushed in response to the HTTP request.

In embodiments, the indication relating to pushing second data comprises a list including at least two different indications relating to pushing second data.

In embodiments, the acknowledgment data comprise one of the at least two different indications relating to pushing second data, the one of the at least two different indications relating to pushing second data being used by the server device to identify the second data to be pushed to the client device.

In embodiments, the indication relating to pushing second data is associated with a type of data of the second data, the type of data comprising a description data type or a content data type, the second data belonging to content data or to description data.

In embodiments, the indication relating to pushing second data is directed to pushing description data updates.

In embodiments, the acknowledgment data contain an indication relating to pushing second data, the indication relating to pushing second data within the acknowledgment data being different than the indication relating to pushing second data within the HTTP request.

In embodiments, the indication relating to pushing second data comprises at least one unique identifier, the at least one unique identifier being representative of directives for pushing second data and of identification of the second data to be pushed or being representative of directives for not pushing second data.

In embodiments, the unique identifier is defined in a centralized repository.

In embodiments, the unique identifier is set as a function of at least one parameter.

According to another object of the invention, there is provided a method of transmitting data between a server device and a client device, comprising the following steps, at the server device:

receiving, from the client device, an HTTP request to obtain first data, wherein the HTTP request includes first data identifying information allowing identification of the first data on the server device and includes one or more additional header fields;

retrieving and sending the first data to the client device; and pushing or not second data to the client device as a function of an indication relating to pushing second data contained within the one or more additional fields.

Accordingly, the method of the invention improves the ability of a server device to push useful data to a client device.

In embodiments, the indication relating to pushing second data comprises a list including at least two different indications relating to pushing second data.

In embodiments, the indication relating to pushing second data is associated with a type of data of the second data, the type of data comprising a description data type or a content data type, the second data belonging to content data or to description data.

In embodiments, the indication relating to pushing second data is directed to pushing description data updates.

In embodiments, the indication relating to pushing second data comprises at least one unique identifier, the at least one unique identifier being representative of directives for pushing second data and of identification of the second data to be pushed or being representative of directives for not pushing second data.

In embodiments, the unique identifier is defined in a centralized repository.

In embodiments, the unique identifier is set as a function of at least one parameter.

According to another object of the invention, there is provided a method of transmitting data between a server device and a client device, comprising the following steps, at the client device:

identifying data to be obtained from the server device;

generating an HTTP request to obtain first data from the identified data, wherein the HTTP request includes first data identifying information allowing identification of the first data on the server device and includes one or more additional header fields containing an indication for the server device to push second data or not to push second data; and sending the HTTP request to the server device to obtain the first data and to drive the server device to push or not second data.

Accordingly, the method of the invention improves the ability of a server device to push useful data to a client device.

In embodiments, the indication relating to pushing second data comprises a list including at least two different indications relating to pushing second data.

In embodiments, the indication relating to pushing second data is associated with a type of data of the second data, the type of data comprising a description data type or a content data type, the second data belonging to content data or to description data.

In embodiments, the indication relating to pushing second data is directed to pushing description data updates.

In embodiments, the indication relating to pushing second data comprises at least one unique identifier, the at least one unique identifier being representative of directives for pushing second data and of identification of the second data to be pushed or being representative of directives for not pushing second data.

In embodiments, the unique identifier is defined in a centralized repository.

In embodiments, the unique identifier is set as a function of at least one parameter.

According to another object of the invention, there is provided a method of receiving data by a client device from a server device, comprising the following steps, at the client device:

sending an HTTP request to obtain first data, wherein the HTTP request includes first data identifying information allowing identification of the first data on the server device and includes one or more additional header fields;

if the client does not want the server device to push any second data, different than the first data, inserting in at least one of the one or more additional header fields an information item indicating that the client does not want any second data to be pushed by the server in response to the HTTP request; and sending the HTTP request to the server device.

Accordingly, the method of the invention prevents transmission of useless data pushed from a server device to a client device.

In embodiments, the information indicating that the client does not want any second data to be pushed by the server comprises at least one unique identifier, the at least one unique identifier being representative of directives for not pushing second data.

In embodiments, the unique identifier is defined in a centralized repository.

In embodiments, the unique identifier is set as a function of at least one parameter.

According to another object of the invention, there is provided a method of sending data from a server device to a client device, comprising the following steps, at the server device:

receiving, from the client device, an HTTP request to obtain first data, wherein the HTTP request includes first data identifying information allowing identification of the first data on the server device and includes one or more additional header fields;

retrieving and sending the first data to the client device; and sending an information item indicating that the server will not push any second data, different than the first data, to the client in response to the HTTP request.

Accordingly, the method of the invention prevents transmission of useless data pushed from a server device to a client device.

In embodiments, the information indicating that the server will not push any second data comprises at least one unique identifier, the at least one unique identifier being representative of directives for not pushing second data.

In embodiments, the unique identifier is defined in a centralized repository.

In embodiments, the unique identifier is set as a function of at least one parameter.

According to another object of the invention, there is provided a method of receiving data by a client device from a server device, comprising the following steps, at the client device:

sending an HTTP request to obtain first data, wherein the HTTP request includes first data identifying information allowing identification of the first data on the server device and includes one or more additional header fields;

if the client does not want the server device to push any second data, different than the first data, inserting in at least one of the one or more additional header fields an information item indicating that the client does not want any second data to be pushed by the server in response to the HTTP request;

sending the HTTP request to the server device;

in response to sending the HTTP request, receiving acknowledgment data from the server device, the acknowledgment data comprising an information item indicating that the server will not push any second data, different than the first data.

Accordingly, the method of the invention prevents transmission of useless data pushed from a server device to a client device.

In embodiments, the information indicating that the client does not want any second data to be pushed by the server comprises at least one unique identifier, the at least one unique identifier being representative of directives for not pushing second data.

In embodiments, the information indicating that the server will not push any second data comprises at least one unique identifier, the at least one unique identifier being representative of directives for not pushing second data.

In embodiments, the unique identifier is defined in a centralized repository.

In embodiments, the unique identifier is set as a function of at least one parameter.

According to another object of the invention, there is provided a method of sending data from a server device to a client device, comprising the following steps, at the server device:

receiving, from the client device, an HTTP request to obtain first data, wherein the HTTP request includes first data identifying information allowing identification of the first data on the server device and includes one or more additional header fields containing an information item indicating that the client does not want any second data to be pushed by the server in response to the HTTP request;

retrieving and sending the first data to the client device; and sending an information item indicating that the server will not push any second data, different than the first data, to the client, in response to the HTTP request.

Accordingly, the method of the invention prevents transmission of useless data pushed from a server device to a client device.

In embodiments, the information indicating that the server will not push any second data comprises at least one unique identifier, the at least one unique identifier being representative of directives for not pushing second data.

In embodiments, the information indicating that the client does not want any second data to be pushed by the server comprises at least one unique identifier, the at least one unique identifier being representative of directives for not pushing second data.

In embodiments, the unique identifier is defined in a centralized repository.

In embodiments, the unique identifier is set as a function of at least one parameter.

In embodiments, the one or more additional header fields are one or more optional header fields.

In embodiments, the first and second data identifying information include first and second uniform resource identifiers, URIs, respectively.

In embodiments, the one or more optional header fields include at least one construction rule to generate the second URI from the content of the HTTP request.

In embodiments, the one or more optional header fields include varying-part information and substitution information, the varying-part information identifying at least one varying subpart in a reference URI and the substitution information including at least one substituting value to replace the varying subpart identified in the reference URI to define the second URI or URIs.

In embodiments, the reference URI includes the first URI included in the received HTTP request.

In embodiments, the varying-part information identifies two or more subparts in the reference URI for substitution using respective substituting value or values included in the substitution information.

In embodiments, the varying-part information associates a respective priority level with each of the two or more subparts in the reference URI to successively consider the substituting values of the two or more subparts according to their respective priority levels.

In embodiments, the additional header field explicitly includes the second URI.

In embodiments, the first data identifying information includes a first uniform resource identifier, URI, identifying a main resource on the server device and includes a subpart information defining a subpart of the main resource as the first data; and the optional header field includes a substituting subpart information to replace the subpart information in the first data identifying information so as to define the second data identifying information.

In embodiments, the subpart information includes a range value of bytes within the main resource.

In embodiments, the first and second data are media segments or media content subparts identified by the first and second data identifying information in a DASH manifest presentation description, respectively.

According to another object of the invention, there is provided a method of transmitting data between a server device and a client device, comprising the following steps, at the server device:

receiving, from the client device, an HTTP request to obtain first data, wherein the HTTP request includes first data identifying information allowing to identify the first data on the server device and includes one or more optional header fields allowing to identify second data;

retrieving and sending the first data to the client device; and if the optional header field is present in the HTTP request:

determining second data identifying information allowing to identify the second data on the server device, using only the optional header field and possibly the first data identifying information. That is using only the content of the HTTP request; and sending a push promise message to announce the push of the second data to the client device and/or pushing the second data to the client device.

From the client's perspective, the invention provides a method of transmitting data between a server device and a client device, comprising the following steps, at the client device:

identifying data to be obtained from the server device;

generating an HTTP request to obtain first data from the identified data, wherein the HTTP request includes first data identifying information allowing to identify the first data on the server device and includes one or more optional header fields defining, based only on the optional header field and possibly on the first data identifying information (i.e. only on the content of the HTTP request), second data identifying information allowing to identify second data from the identified data on the server device;

sending the HTTP request to the server device to obtain the first data and to drive the server device to push the second data.

Correlatively, the invention provides a server device for exchanging data with a client device, the device comprising at least one microprocessor configured for carrying out the steps of:

receiving, from the client device, an HTTP request to obtain first data, wherein the HTTP request includes first data identifying information allowing to identify the first data on the server device and includes one or more optional header fields allowing to identify second data;

retrieving and sending the first data to the client device; and if the optional header field is present in the HTTP request:

determining second data identifying information allowing to identify the second data on the server device, using only the optional header field and possibly the first data identifying information; and sending a push promise message to announce the push of the second data to the client device and/or pushing the second data to the client device.

Also, the invention provides a client device for exchanging data with a server device, the device comprising at least one microprocessor configured for carrying out the steps of:

identifying data to be obtained from the server device;

generating an HTTP request to obtain first data from the identified data, wherein the HTTP request includes first data identifying information allowing to identify the first data on the server device and includes one or more optional header fields defining, based only on the optional header field and possibly on the first data identifying information, second data identifying information allowing to identify second data from the identified data on the server device;

sending the HTTP request to the server device to obtain the first data and to drive the server device to push the second data.

In HTTP/2, push promise messages precede the actual push of corresponding data. Other protocols, especially bi-directional protocols like Web Sockets or SPDY (standing for SPeeDY, can directly push the second data without previous push announcement.

Thanks to the invention, the client device efficiently controls the push mechanism by the server device, while enabling backward compatibility. It reduces mismatch between the push data and the client's needs. This is because the second data (resources or part of resources) the client device wants to be pushed are defined using an optional header field of a conventional HTTP request. Further, the backward compatibility comes from the fact that, if the server device is conventional, i.e. does not support the optional header field, it can still process the HTTP request conventionally, without processing error.

For the server that understands the optional header field but does not support the push feature, it can use the information from the optional header field to pre-fetch resources, in case the server is not the content server but a relay server.

In addition, this invention makes it possible to rely on low-skilled servers, for instance that do not have DASH knowledge. This is because the identification of the second data to be pushed does not require the MPD file or the like to be processed. According to the invention, only the optional header field and possibly the first data identifying information are used to perform such identification.

Embodiments of the invention thus provide a lightweight mechanism for server-guided streaming, including a client-driven server push approach. Embodiments may be implemented in the context of DASH networks.

Embodiments of the invention are compatible with existing HTTP/2 features. These features can advantageously be used for implementing embodiments of the invention.

Network performances are generally increased.

Optional features of the methods and devices are defined in the dependent claims. Some of them are explained below with respect to the methods. However they can also apply to the corresponding devices.

In one embodiment, the first and second data identifying information include first and second uniform resource identifiers, URIs, respectively.

In a particular embodiment, the one or more optional header fields include at least one construction rule to generate the second URI from the content of the HTTP request. In other words, the optional header field defines implicitly the second URI or URIs, using a construction rule. As inferred from the above, the construction rule only uses the optional header field and possibly the first URI to obtain the second URI or URIs.

For instance, the one or more optional header fields include varying-part information and substitution information, the varying-part information identifying at least one varying subpart in a reference URI and the substitution information including at least one substituting value to replace the varying subpart identified in the reference URI to define the second URI or URIs. This provision thus defines how a construction rule may be used.

According to a specific feature, the reference URI includes the first URI included in the received HTTP request. In other words, the construction rule (substitution process) applies on the first URI, i.e. on the URI of the requested first data. It means that the construction rule (that may be generic) infers the second data to be pushed from the requested first data, but using only the content of the HTTP request.

According to another specific feature, the varying-part information identifies two or more subparts in the reference URI for substitution using respective substituting value or values included in the substitution information. Thus complex second URIs may be generated from the first URI.

According to yet another specific feature, the varying-part information associates a respective priority level with each of the two or more subparts in the reference URI to successively consider the substituting values of the two or more subparts according to their respective priority levels. Thanks to this provision, the client device orders the second URIs and thus drives the order in which the second data are pushed by the server device.

In some embodiments, the optional header field explicitly includes the second URI. This is to oppose to the implicit definition of the second URI or URIs, using for instance a construction rule.

In other embodiments, the first data identifying information includes a first uniform resource identifier, URI, identifying a main resource on the server device and includes a subpart information defining a subpart of the main resource as the first data; and the optional header field includes a substituting subpart information to replace the subpart information in the first data identifying information so as to define the second data identifying information.

An example of subpart information is the Range parameter used in DASH. In this example, the subpart information includes a range value of bytes within the main resource.

According to embodiments, the first and second data are media segments or media content subparts identified by the first and second data identifying information in a DASH manifest presentation description, respectively. Note that the use of the DASH Range parameter makes it possible to identify media content/segment subparts, while a URI in DASH usually identifies a whole media segment.

Compared to known prior art, there is also a need to help the client device to drive or guide the server push feature. In this context, the present invention also provides a method of transmitting data between a server device and a client device, comprising the following steps, at the server device:

receiving, from the client device, an HTTP request to obtain first data, wherein the HTTP request includes a first optional header field comprising one or more filtering parameters;

retrieving and sending the first data to the client device; and if the first optional header field is present in the HTTP request:

identifying a set of data using a main resource obtained from the HTTP request;

filtering each data of the identified set, using the one or more filtering parameters to obtain a list of second data; and pushing the second data to the client device.

With protocols that include the push promise feature, the method further includes, prior to pushing the second data, sending push promise messages to announce the push of the second data to the client device.

From the client's perspective, the invention provides a method of transmitting data between a server device and a client device, comprising the following steps, at the client device:

generating an HTTP request to obtain first data, wherein the HTTP request includes a first optional header field comprising one or more filtering parameters;

sending the HTTP request to the server device to obtain the first data and to drive the server device to push, according to the filtering parameters, second data referenced in a main resource inferred from the HTTP request.

The one or more filtering parameters:

define a resource type; and the resource type or types include one or more types from an application type, a text type, an image type, a video type, an audio type; or identify one or more groups of data using identifiers of elements in a DASH media presentation description; or are defined in the first optional header field using time ranges identifying subpart of the main resource.

Also, push promise messages may be received.

Correlatively, the invention provides server device for exchanging data with a client device, the device comprising at least one microprocessor configured for carrying out the steps of:

receiving, from the client device, an HTTP request to obtain first data, wherein the HTTP request includes a first optional header field comprising one or more filtering parameters;

retrieving and sending the first data to the client device; and if the first optional header field is present in the HTTP request:

identifying a set of data using a main resource obtained from the HTTP request;

filtering each data of the identified set, using the one or more filtering parameters to obtain a list of second data; and pushing the second data to the client device.

The one or more filtering parameters:

define a resource type; and the resource type or types include one or more types from an application type, a text type, an image type, a video type, an audio type; or identify one or more groups of data using identifiers of elements in a DASH media presentation description; or are defined in the first optional header field using time ranges identifying subpart of the main resource.

Also, the invention provides a client device for exchanging data with a server device, the device comprising at least one microprocessor configured for carrying out the steps of:

generating an HTTP request to obtain first data, wherein the HTTP request includes a first optional header field comprising one or more filtering parameters;

sending the HTTP request to the server device to obtain the first data and to drive the server device to push, according to the filtering parameters, second data referenced in a main resource inferred from the HTTP request.

An exemplary illustration of this approach is the requesting of a main HTML web page as first data. Then the optional header field may define which type or types of sub-resources referenced in the HTML page should be pushed. The optional header field thus acts as a filtering parameter. For instance, it may provide the filtering parameter "images/*.jpg" to filter the sub-resources in order to have only the subset of jpg images pushed.

The improved control of the server push feature by the client device is obtained through the use of filtering parameters to apply to data identified by the request, through the optional header field.

Again the use of such optional header field allows backward compatibility at the server's end.

Embodiments of the invention thus provide a lightweight mechanism for server-guided streaming, including a client-driven server push approach. Embodiments may be implemented in the context of DASH networks.

Embodiments of the invention are compatible with existing HTTP/2 features. These features can advantageously be used for implementing embodiments of the invention.

Network performances are generally increased.

Optional features of the methods and devices are defined in the dependent claims. Some of them are explained below with respect to the methods. However they can also apply to the corresponding devices.

In embodiments, the main resource is the first data. It means that the HTTP request taken alone makes it possible for the server device to efficiently identify all the second data to be pushed. The server device does not require additional knowledge, such as DASH knowledge for the above-discussed prior art. Low-skilled server devices may thus be used.

In other embodiments, the HTTP request includes a second optional header field defining a uniform resource identifier, URI, identifying the main resource on the server device. Such embodiment can be implemented when the client device needs to first obtain the main resource and then to analyze it in order to identify (and define using the optional header field) the filtering parameters to actually select the appropriate second data from the main resource. Indeed, in such case, the client device cannot define the filtering parameters when requesting the main resource because it has not yet access to the content of the main resource.

Thanks to this provision, the client may designate static configuration files stored on the server that may define lists of resources per resource types. Using such static configuration file requires low skilled for the server to identify resources based on resource type filtering parameters.

In yet other embodiments, two (or more) filtering parameters are associated with two (or more) respective groups of data and with two respective priority levels; and the filtering step arranges the second data in order according to the priority level of the groups to which they respectively data, to obtain an ordered list of second data; and the pushing step pushes the second data according to the ordered list. At the client's end, it means that two filtering parameters are associated with two groups of data and with two respective priority levels; and the second data are received in an order according to the priority level of the groups to which they respectively belong. This makes it possible for the client device to efficiently drive the order in which it wishes to receive the pushed data.

In yet other embodiments, each filtering parameter defines a resource type; and the resource type or types include one or more types from an application type (e.g. javascript), a text type (e.g. css or html), an image type (e.g. png or jpg), a video type (e.g. mp4 or webm), an audio type (e.g. mp3 or wav).

This provision particularly applies to html or the like exchanges, such as for web page loading. Of course, sub-division of any of these resource types may help to efficiently drive the loading of specific contents (for instance, images, or embedded functions like Javascript functions).

In yet other embodiments, the one or more filtering parameters in the first optional header field identify one or more groups of data using identifiers of elements in a DASH media presentation description. Such elements may include an AdaptationSet element, a Presentation element or a Segment element of a DASH MPD. In an embodiment, the first data requested by the HTTP request is the DASH MPD. Of course, in a variant, the DASH MPD may be specified in the above-mentioned second optional header field.

This provision makes it possible for the client device to control the push of some parts of media content defined by the MPD.

In yet other embodiments, the one or more filtering parameters are defined in the first optional header field using time ranges identifying subpart of the main resource, for instance time range used in DASH requests. Like the previous provision, this one also makes it possible for the client device to control how subparts of a media content streamed using DASH are pushed by the server device.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the method and device, in particular that of improving client's control of the server Push feature and of relying on low-skilled server devices.

Yet another aspect of the invention relates to a device comprising means adapted for carrying out each step of any method as defined above.

Yet other aspects of the invention relate to a method of transmitting resources between a server device and a client device, substantially as herein described with reference to, and as shown in, FIG. 3a or 3b or 5a or 5b or 6a or 7b or 8 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which:

FIG. 5a shows main steps illustrating the client's behavior in the system of FIG. 3a;

FIG. 7a illustrates an exemplary MPD file having Segment Template;

FIG. 7b illustrates client-server exchanges implementing the invention, based on the MPD file of FIG. 7a;

FIG. 10 shows an MPD sample illustrating the declaration of template URIs at several levels;

DETAILED DESCRIPTION OF EMBODIMENTS OF THE INVENTION

Figure 1A:
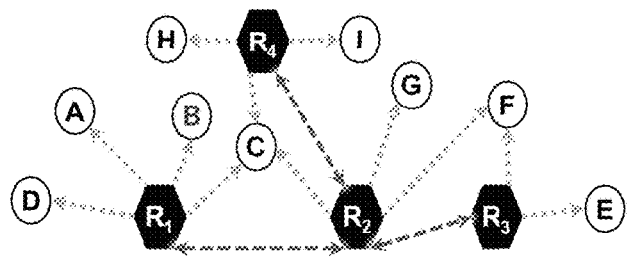
FIG. 1a illustrates, using a graph, a set of resources interlinked to a main resource, such as a web page.

As briefly introduced above, the invention relates to data transmission over HTTP communication networks. An example of application is adaptive data streaming such as DASH. HTTP is the protocol used for sending web resources, typically web pages. HTTP implies a client and a server:

The client sends a request to the server, the request being made of a "request_line" optionally followed by different kinds of "headers". The "request-line" usually contains a method (for instance "GET") together with a "Request-URI" parameter that identifies, possibly with a Range header or the like, the requested resource or data on the server;

The server replies to the client's request with a response that contains a representation of the web resource.

Requests and responses are messages comprising various parts, notably the HTTP headers. An HTTP header comprises a name along with a value. For instance, if considering "Host: en.wikipedia.org", "Host" is the header name, and its value is "en.wikipedia.org". It is used for indicating the host of the resource queried (for instance, the Wikipedia page describing HTTP is available at HTTP://en.wikipedia.org/wiki/HTTP). HTTP headers appear on client requests and server responses.

HTTP/2, a new version of HTTP, makes it possible to exchange requests/responses through streams. A stream is created inside an HTTP/2 connection for every HTTP request and response exchange. Frames are exchanged within a stream in order to convey the content, pseudo-headers and headers of the requests and responses.

HTTP/2 defines a limited set of frames with different meanings, such as:

HEADERS: which is provided for transmission of HTTP headers

HTTP/2 distinguishes headers (optional, i.e. ignored when not understood by the processing device) from pseudo-headers that follow stricter rules. The latter corresponds to the mapping of the request-line defined in previous HTTP versions to indicate the HTTP method and the request-URI. In the present document, "HTTP header" or "header" is meant to designate the optional headers, and not the pseudo-headers which are explicitly designated as such.

Furthermore, still in the present document, "Request-URI" is meant to designate the Request-URI as defined in RFC2616 (i.e. the parameter identifying the requested resource on the server as used in the "request-line") or its equivalence/translation into HTTP/2 pseudo-headers.

DATA: which is provided for transmission of HTTP message content

PUSH_PROMISE: which is provided for announcing pushed content

PRIORITY: which is provided for setting the priority of a stream

WINDOW_UPDATE: which is provided for updating the value of the control flow window SETTINGS: which is provided for conveying configuration parameters CONTINUATION: which is provided for continuing a sequence of header block fragments RST_STREAM: which is provided for terminating or cancelling a stream.

In HTTP/2, a request is then translated into a first HEADER frame plus one or more DATA frames where the request-line from HTTP/1.x is translated into pseudo-header fields as described in HTTP/2 specification.

The present description uses "request" or "HTTP request" to designate a message sent from client to server and "response" or "HTTP response" to designate a message from server to client. In addition to requests and responses, we also talk about notification or server notification that corresponds to a message initiated by a server to a client. This wording is compliant with HTTP/1.x and HTTP/2.

Push by servers has been introduced in HTTP/2 for allowing servers to send unsolicited web resource representations to clients. Web resources such as web pages generally contain links to other resources, which themselves may contain links to other resources. To fully display a web page, all the linked and sub-linked resources may need to be retrieved by a client. This incremental discovery may lead to a slow display of a web page, especially on high latency networks such as mobile networks.

When receiving a request for a given web page, the server may know which other resources are needed for the full processing of the requested resource. By sending the requested resource and the linked resources at the same time, the server allows reducing the load time of the web page. Thus, using the push feature, a server may send additional resource representations at the time it is requested a given resource.

As an example of linked resources, FIG. 1a shows a graph of a set of resources owned by a server with their relationships. The set of resources is intertwined: $R_1$, $R_2$, $R_3$, and $R_4$ are resources that need to be downloaded together to be properly processed by a client. In addition, sub-resources A to H are defined. These sub-resources are related to 1, 2 or 3 resources. For instance, A is linked to $R_1$ and C is linked to $R_1$, $R_2$ and $R_4$.

Figure 1B:
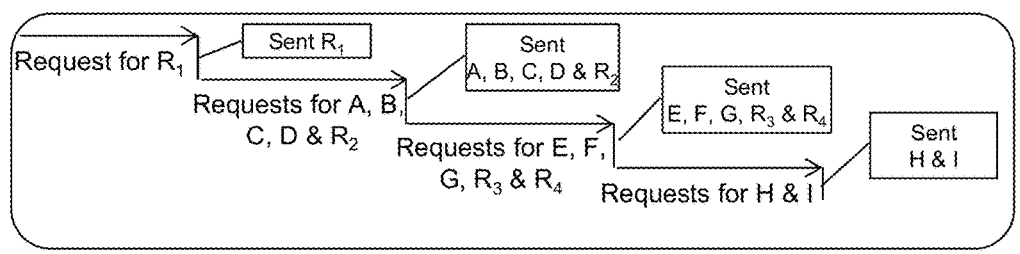
FIGS. 1b and 1c illustrate the loading of the main resource of FIG. 1a, without using the push feature and using the push feature, respectively.
Figure 1C:
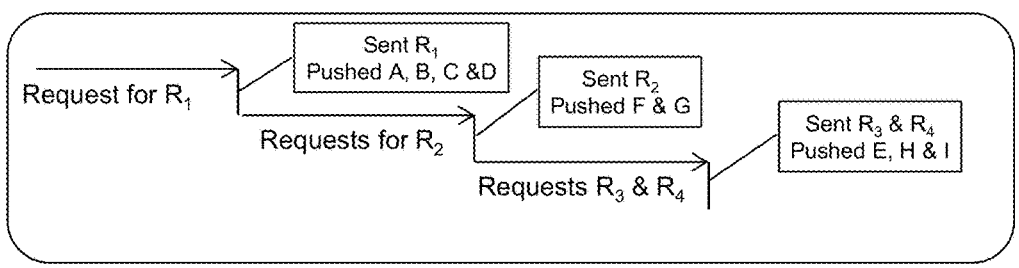
Figure 1D:
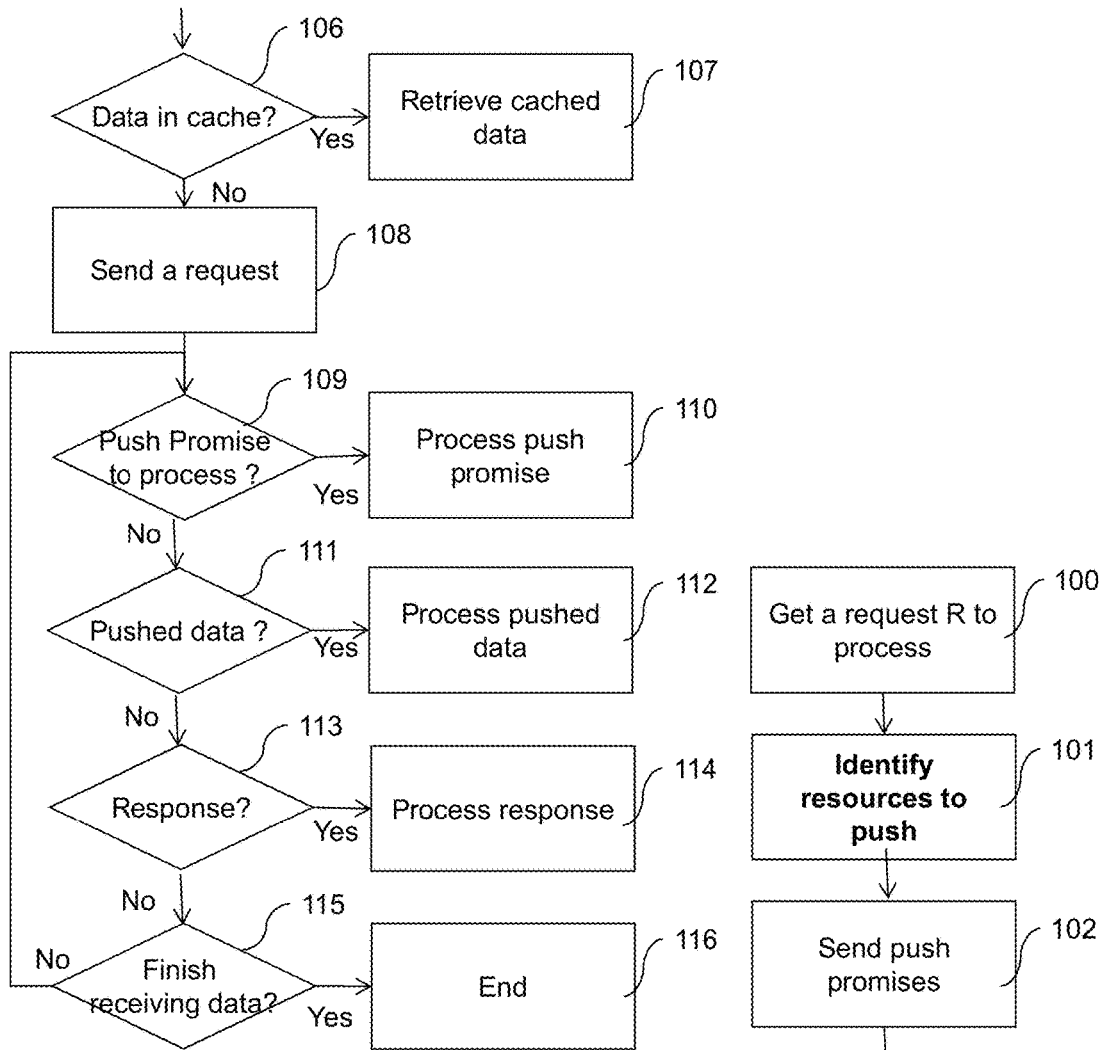
FIG. 1d illustrates, using a flowchart, conventional steps of a client device when the push feature is implemented.
Figure 1E:
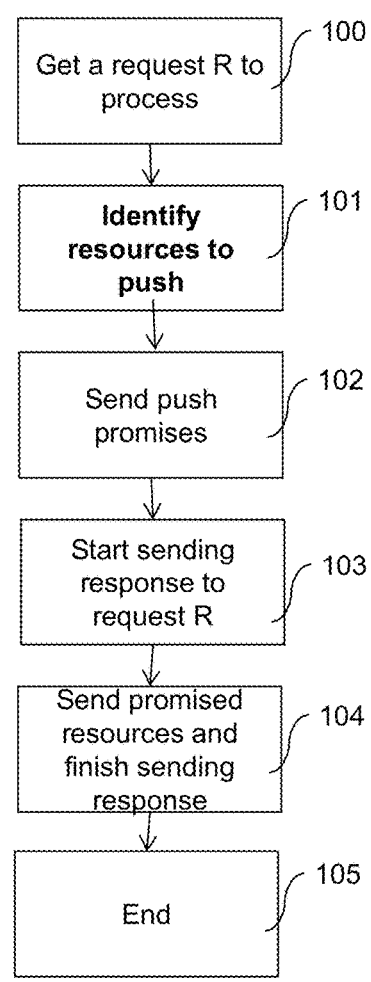
FIG. 1e illustrates, using a flowchart, conventional steps of a server device when the push feature is implemented.

With reference to the flowchart of FIG. 1e, an exemplary mode of operation of a server implementing the push feature is described.

During step 100, the server receives an initial request. Next, the server identifies during step 101 the resources to push as part of the response and sends PUSH promise messages to the client during step 102. Then it starts sending the content response during step 103. The PUSH promise messages identify the other resources that the server is planning to push, for instance based on the dependencies shown in FIG. 1a. These messages are sent in order to let the client know in advance which pushed resources will be sent. In particular, this reduces the risk that a client sends a request for a resource that is being pushed at the same time or about to be pushed. In order to further reduce this risk, a server should send a push promise message before sending any part of the response referring to the resource described in the push promise. This also allows clients to request cancellation of the push of the promised resources if clients do not want those resources. Next, the server sends the response and all promised resources during step 104. The process ends during a step 105.

FIGS. 1b and 1c illustrate web page loading without using the push feature and using the push feature, respectively.

FIG. 1b shows an HTTP exchange without using the server PUSH feature: the client requests $R_1$, next it discovers $R_2$, A, B, C and D and request them. After receiving them, the client requests $R_3$, $R_4$, F and G. Finally the client requests H and I sub-resources. Thus, a request must be sent for every resource needed: resources R1 to R4 and sub-resources A to I. Furthermore, this process requires four round-trips to retrieve the whole set of resources.

FIG. 1c illustrates the HTTP exchange using the feature of pushing directly connected sub-resources by the server. After requesting $R_1$, the server sends $R_1$ and pushes A, B, C and D. The client identifies $R_2$ and requests it. The server sends $R_2$ and pushes F and G. Finally the client identifies $R_3$, $R_4$ and requests these resources. The server sends $R_3$, $R_4$ and pushes H and I. Thus, the number of requests is limited to elements R1 to R4. Elements A to I are "pushed" by the server to the client based on the dependencies shown in FIG. 1a, thereby making the associated requests unnecessary. This process requires three round-trips to retrieve the whole set of resources.

Thus, as illustrated in FIGS. 1b and 1c, when servers use the push feature, the number of HTTP round-trips (request+response) necessary for loading a resource with its sub-resources is reduced. This is particularly interesting for high-latency networks such as mobile networks.

Figure 2:
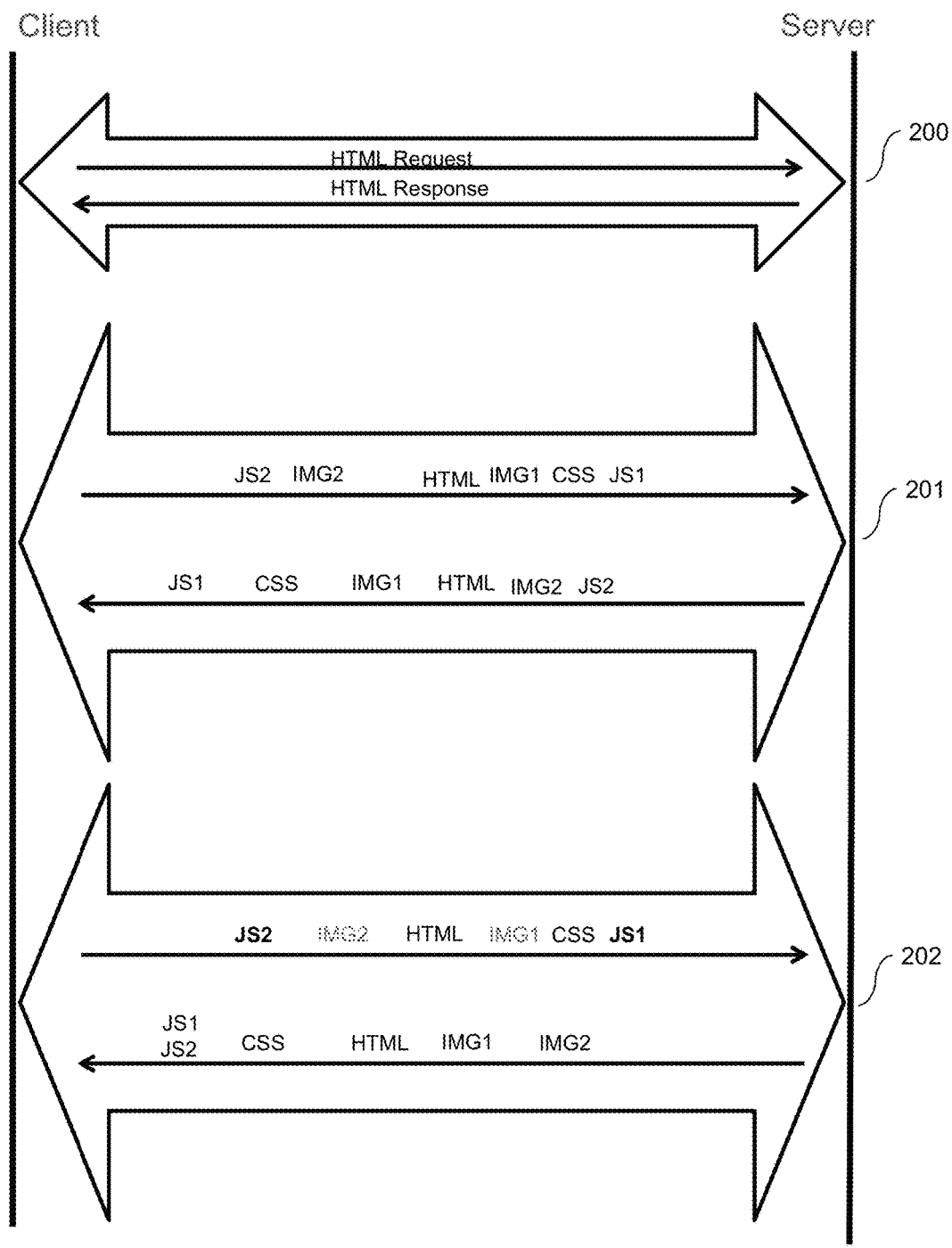
FIG. 2 illustrates HTTP exchanges to load a web page.

In order to decrease the loading time of a set of resources, typically a web page and its sub-resources, HTTP/2 allows exchanging multiple request and response priorities in parallel. As illustrated in FIG. 2, a web page may require the download of several resources, like JavaScript, images etc. During an initial HTTP exchange 200, the client retrieves an HTML file. This HTML file contains links to two JavaScript files (JS1, JS2), two images (IMG1, IMG2), one CSS file and one HTML file. During an exchange 201, the client sends a request for each file. The order given in the exchange 201 of FIG. 2 is based on the web page order: the client sends a request as soon as a link is found. The server then receives requests for JS1, CSS, IMG1, HTML, IMG2 and JS2 and processes these requests according that order. The client then retrieves these resources in that order.

The client may want to have its proper order for downloading the sub-resources referenced in the Web page description (the HTML file). In such case, it may be valuable for the server to have this information, in particular to implement the push feature using this order.

The flowchart of FIG. 1d illustrates the process on the client side when the push feature is implemented.

When the client has identified a resource to retrieve from the server, it first checks during a step 106 whether or not the corresponding data is already in its cache memory. In case the resource is already in the cache memory (Yes), it is retrieved from it during a step 107. Cached data may be either data retrieved from previous requests or data that were pushed by the server previously. In case it is not in the cache memory (No), the client sends a request during step 108 and waits for the server's response.

Upon receipt of a frame from the server, the client checks during step 109 whether or not the frame corresponds to a PUSH promise. If the data frame corresponds to the PUSH promise (Yes), during step 110, the client processes the PUSH promise. To do so, the client identifies the resource to be pushed. If the client does not wish to receive the resource, the client may send an error message to the server so that the server does not push that resource. Otherwise, the client stores the PUSH promise until receiving the corresponding pushed content. The PUSH promise is used so that the client does not request the promised resource while the server is pushing it.

In case the data frame does not correspond to the PUSH promise (No), it is checked, during step 111, whether or not, the frame is a data frame related to pushed data. In case it is related to pushed data (Yes), the client processes the pushed data during step 112. The pushed data is stored within the client cache.

In case the frame is not a data frame related to pushed data (No), it is checked, during step 113, whether it corresponds to a response received from the server. In case the frame corresponds to a response from the server (Yes), the response is processed during step 114 (e.g. sent to the application).

Otherwise (No), it is checked during step 115 whether or not the frame identifies the end of a response (Yes). In this case, the process is terminated during step 116. Otherwise, the process loops back to step 109.

Thus, it appears that the client receives the response and the promised resources. The promised resources are therefore generally stored in the client cache while the response is used by the application such as a browser displaying a retrieved web page. When a client application requests one of the resources that were pushed, the resource is immediately retrieved from the client cache, without incurring any network delay.

The storage of pushed resources in the cache is controlled using the cache control directives. The cache control directives are also used for controlling of the responses. These directives are in particular applicable to proxies: any resource pushed or not, may be stored by proxies or by the client only.

As mentioned above, the client may want to have its proper order for downloading the sub-resources referenced in the Web page description (the HTML file), and thus should drive the push feature at the server's end. The present invention intends to improve the current situation in this respect, for instance in order to inform the server of a particular set of (sub-)resources or part(s) of a (sub-)resource a client may want after requesting a first resource. In particular, the invention seeks to fit with servers having minimal intelligence, for instance servers that have no knowledge to process the Web page description or the like, from which the (sub-)resources have been identified by the client.

Such need for the present invention is increased in the context of HTTP streaming over HTTP, for instance in the context of adaptive HTTP streaming such as DASH, when using the push feature.

Figure 3:
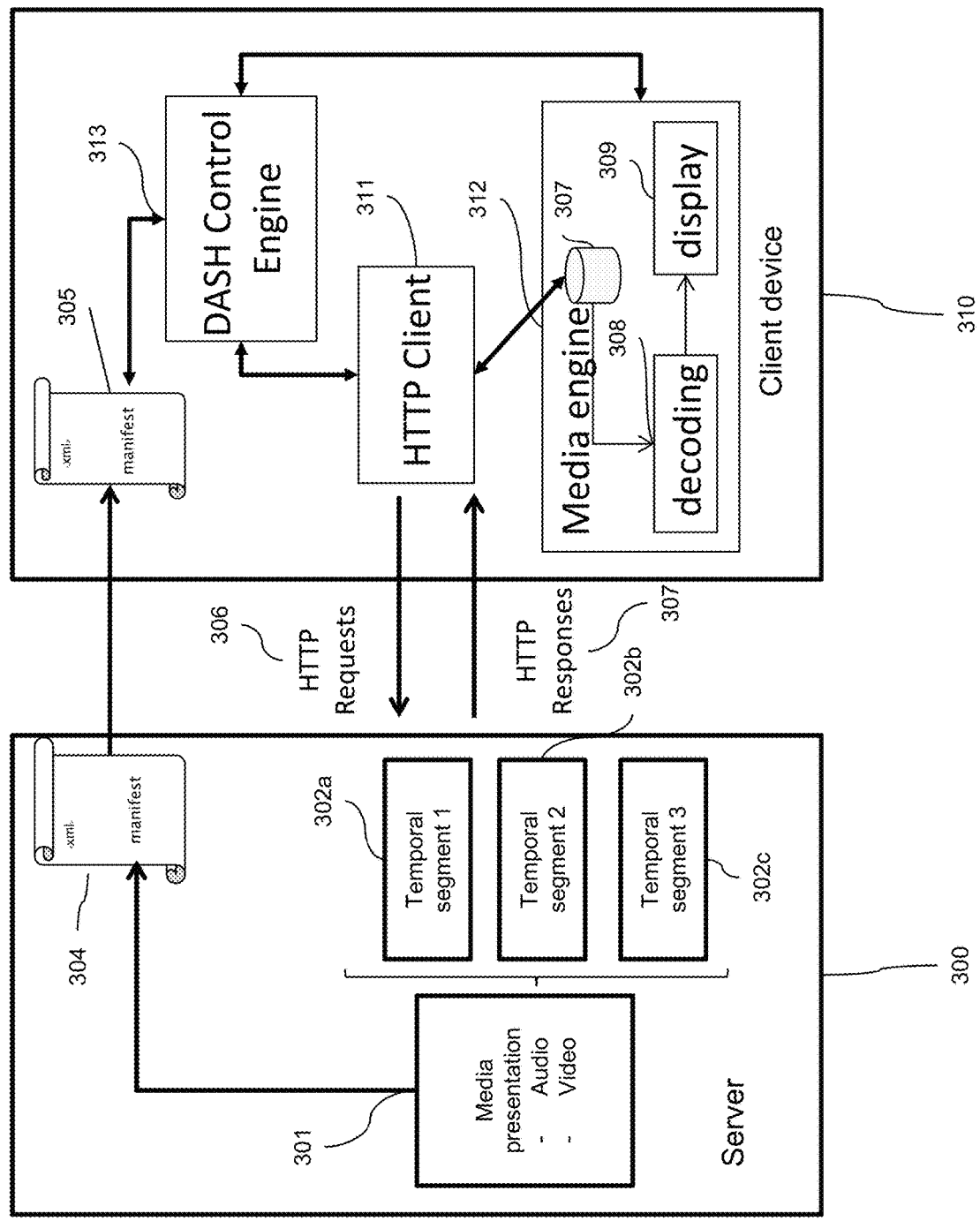
FIG. 3 illustrates a DASH-oriented client-server system according to the prior art.

The general principle of Media streaming over HTTP is illustrated in FIG. 3. Most of the new protocols and standards for adaptive media streaming over HTTP are based on this principle. This is the case of DASH, to which the description below makes reference.

A media server 300 streams data to a client 310. The media server stores media presentations. For example, media presentation 301 contains audio and video data. Audio and video may be interleaved in a same file. The way the media presentation is built is described in what follows with reference to FIG. 4a. The media presentation is temporally split into small independent and consecutive temporal segments 302a, 302b and 302c, such as MP4 segments, that can be addressed and downloaded independently. The downloading addresses (HTTP URLs) of the media content for each of these temporal segments are set by the server to the client. Each temporal segment of the audio/video media content is associated with one HTTP address.

The media server also stores a manifest file document 304 (an example of which is shown in FIG. 7a) that describes the content of the media presentation including the media content characteristics (e.g. the type of media: audio, video, audio-video, text etc.), the encoding format (e.g. the bitrate, the timing information etc.), the list of temporal media segments and associated URLs. Alternatively, the document contains template information that makes it possible to rebuild the explicit list of the temporal media segments and associated URLs. This document may be written using the eXtensible Markup Language (XML).

The manifest file is sent to the client. Upon receipt of the manifest file during a step 305, the client is informed of the association between temporal segments of the media contents and HTTP addresses. Also, the manifest file provides the client with the information concerning the content of the media presentation (interleaved audio/video in the present example). The information may include the resolution, the bit-rate etc.

Based on the information received, the HTTP client module 311 of client can emit HTTP requests 306 for downloading temporal segments of the media content described in the manifest file. The server's HTTP responses 307 convey the requested temporal segments. The HTTP client module 311 extracts from the responses the temporal media segments and provides them to the input buffer 307 of the media engine 312. Finally, the media segments can be decoded and displayed during respective steps 308 and 309.

The media engine 312 interacts with the DASH control engine 313 in order to have the requests for next temporal segments to be issued at the appropriate time. The next segment is identified from the manifest file. The time at which the request is issued depends on whether or not the reception buffer 307 is full. The DASH control engine 313 controls the buffer in order to prevent it from being overloaded or completely empty.

Figure 4A:
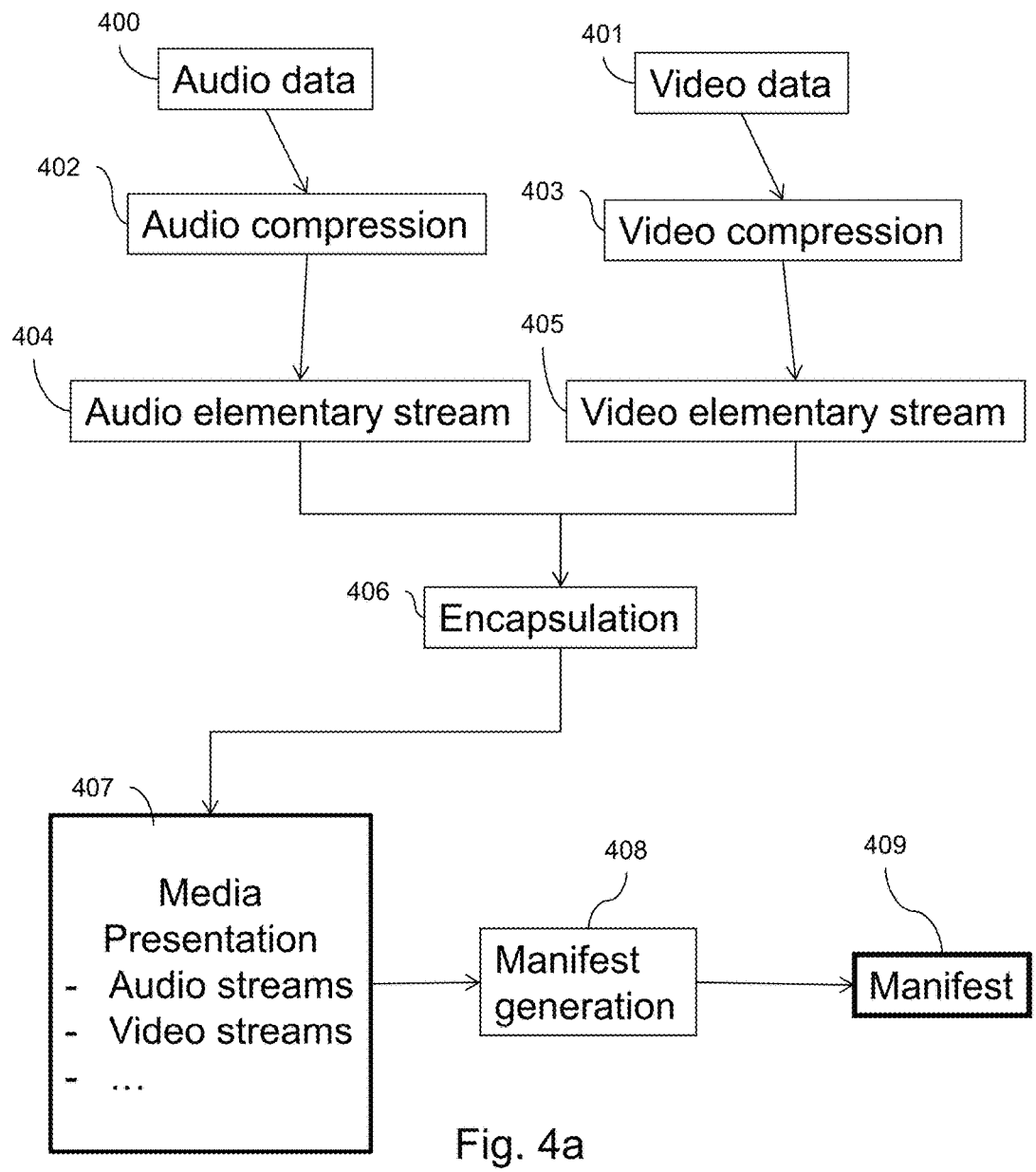
FIG. 4a illustrates the building of media presentation.

The generation of the media presentation and the manifest file is described with reference to FIG. 4a. During steps 400 and 401, audio and video data are acquired. Next, the audio data are compressed during 402. For example, the MP3 standard can be used. Also, the video data are compressed in parallel during step 403. Video compression algorithms such as MPEG4, MPEG/AVC, SVC, HEVC or scalable HEVC can be used. Once compression of audio and video data has been performed, audio and video elementary streams 404, 405 are available. The elementary streams are encapsulated during a step 406 into a global media presentation. For example, the ISO BMFF standard (or the extension of the ISO BMFF standard to AVC, SVC, HEVC, scalable extension of HEVC etc.) can be used for describing the content of the encoded audio and video elementary streams as a global media presentation. The encapsulated media presentation 407 thereby obtained is used for generating, during step 408, an XML manifest file 409. Several representations of video data 401 and audio data 400 can be acquired, compressed, encapsulated and described in the media presentation 407.

Figure 4B:
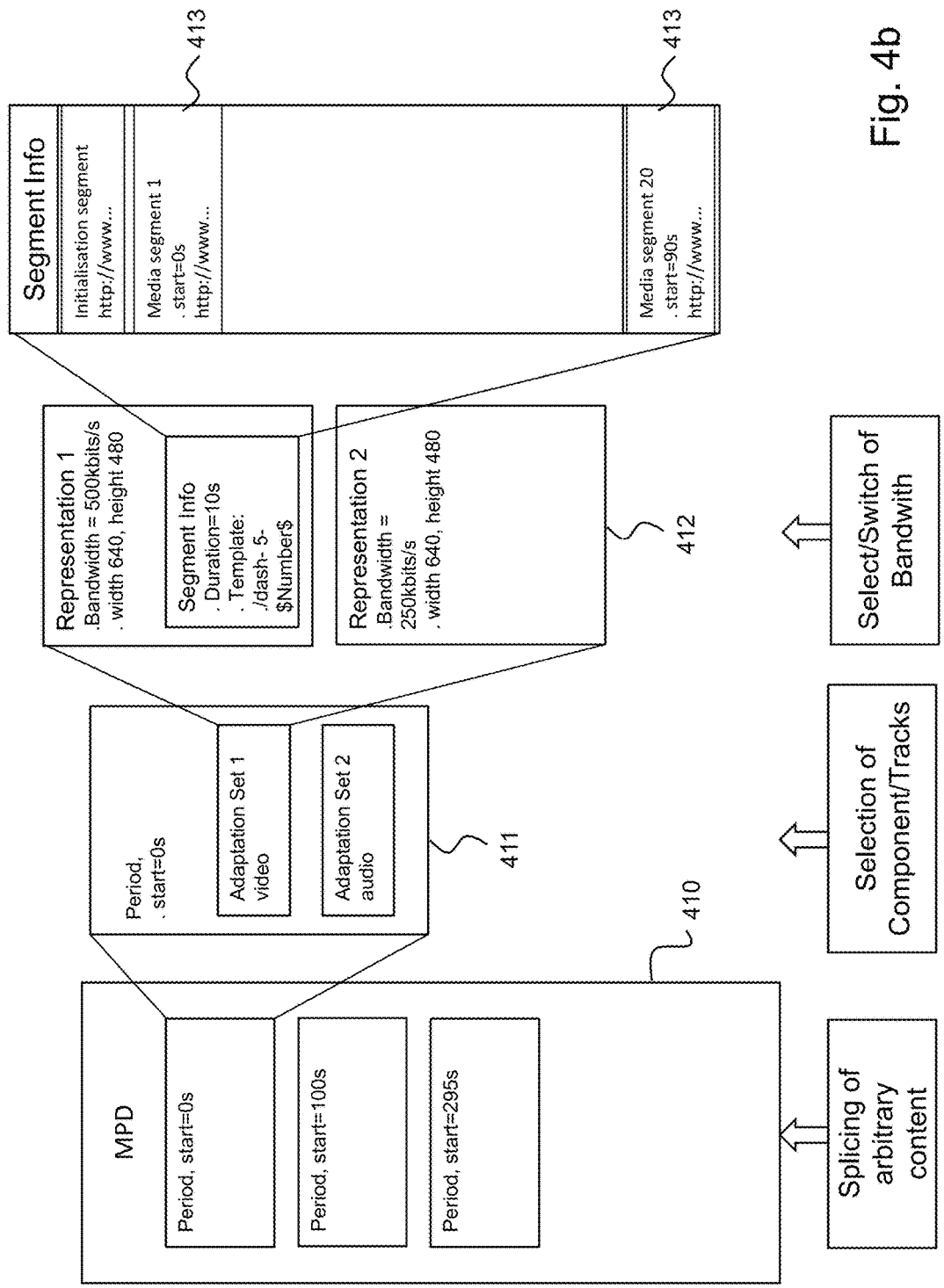
FIG. 4b illustrates the structure of a DASH media presentation description, MPD, file.

For the specific case of MPEG/DASH streaming protocol illustrated in FIG. 4b, the manifest file is called "Media Presentation Description" (or "MPD" file). The root element of the file is the MPD element that contains attributes applying to all the presentation plus DASH information like profile or schema. The media presentation is split into temporal periods represented by a Period element. The MPD file 410 contains all the data related to each temporal period. By receiving this information, the client is aware of the content for each period of time. For each Period 411, AdaptationSet elements are defined.

A possible organization is to have one or more AdaptationSet per media type contained in the presentation. An AdaptationSet 412 related to video contains information about the different possible representations of the encoded videos available at the server. Each representation is described in a Representation element. For example, a first representation can be a video encoded with a spatial resolution of 640×480 and compressed with a bit rate of 500 kbits/s. A second representation can be the same video but compressed with a bit rate of 250 kbits/s.

Each video can then be downloaded by HTTP requests if the client knows the HTTP addresses related to the video. The association between the content of each representation and the HTTP addresses is done by using an additional level of description: the temporal segments. Each video representation is split into temporal segments 413 (typically few seconds). Each temporal segment comprises content stored at the server that is accessible via an HTTP address (URL or URL with one byte range). Several elements can be used for describing the temporal segments in the MPD file: SegmentList, SegmentBase or SegmentTemplate.

In addition, a specific segment is available: the initialization segment. The initialization segment contains MP4 initialization information (if the video has been encapsulated using the ISO BMFF or extensions thereof) that describes the encapsulated video stream. For example, it helps the client to instantiate the decoding algorithms related to the video.

The HTTP addresses of the initialization segment and the media segments are indicated in the MPD file. It has to be noted that in this description, "segment" is used to designate either temporal fragments (ex: one or more moof+mdat boxes in a mp4 file when the media is encapsulated according to ISO/IEC 14496 Part 12 and Part 15) or temporal segments (for example mp4 segments starting with "styp" indication).

In FIG. 7a, there is shown an exemplary MPD file. Two video representations are described in the MPD file shown. The first one is a low resolution version ("Representation id=κh264bl_low"") while the second one is a higher resolution version ("Representation id="h264bl_full""). Both video representations are contained in the same AdaptationSet and each segment from each representation is addressed through SegmentTemplate URLs ("media="mp4-live-$RepresentationID$-$Number$.m4s"" where $RepresentationID$ varies between the two possible video representations, and $Number$ varies along the position in the video).

For clarity, possible associated audio streams are not represented, they could be described in another AdaptationSet, each with alternative versions.

When starting a streaming session, a DASH client requests the manifest file. Once received, the client analyzes the manifest file, selects a set of AdaptationSets suitable for its environment. Next, the client selects in the MPD, within each AdaptationSet, a Representation compatible with its bandwidth, decoding and rendering capabilities. Next, it builds in advance the list of segments to be requested, starting with initialization information for the media decoders (the SegmentTemplate@initialization URL in the example of FIG. 7a). When initialization information is received by the decoders, they are initialized and the client requests first media data and buffers a minimum data amount before actually starting the display.

These multiple requests/responses may introduce delay in the startup of the streaming session. The risk is for service providers to see their clients leaving the service without starting to watch the video. It is common to name this time between the initial HTTP request for the first media data chunk, performed by the client, and the time when the media data chunk actually starts playing as the start-up delay. It depends on the network round-trip time but also on the size of the media segments: the longer the segments, the longer the start-up delay.

In addition, in live streaming, at the time a client requests a media segment, this segment may not be ready on the server. To reduce the latency, it may then worth reducing the segment length. However, such reducing of the segment length may dramatically increase the number of requests/responses and lead to significant network traffic overhead.

To reduce such traffic overhead increase, a proposed approach is to use the push feature of HTTP/2 at the server to enable data to be pushed to the client upon server's initiative only. More generally regarding HTTP, such approach (use of the push feature) makes it possible to reduce the number of roundtrips between an HTTP client and an HTTP server (and then the latency) so that a resource may be organized into many sub-resources (for instance a Web page containing css, jscript, images; or a DASH manifest containing list of segments).

As mentioned above, such use of the push feature in the context of DASH streaming over HTTP has already been proposed in publication WO 2015/004276.

The mechanisms proposed in this publication require that the server device has sophisticated knowledge of DASH, in particular to be able to apply a push policy on the MPD files to determine which data or resource to push according to the push policy.

Those mechanisms go against some useful aspects of the adaptive streaming over HTTP.

To be more precise, adaptive streaming over HTTP is based on the assumption that the client guides the streaming, as the client can generally select the best version of a multimedia content for its purpose. For instance, a client may know whether to request HD or SD video based on its form-factor and screen resolution. The use of the push feature for adaptive streaming over HTTP should keep such behavior, enabling the client to fully drive the server with regards to the pushed data.

In addition, adaptive streaming over HTTP like MPEG DASH standard requires almost no intelligence at the server side: a simple HTTP server is enough to serve manifest and media segments because the HTTP requests sent by the client are simple. Such simplicity of the server makes it possible to provide a large number of streaming clients without requiring any additional cost on server resources beyond standard web usage of HTTP. In particular, the large number of streaming clients may be managed through a content delivery network using standard HTTP optimization techniques. The use of the push feature for adaptive streaming over HTTP should keep this server simplicity.

The present invention aims at improving the use of the push feature in the general context of HTTP. It particularly applies to streaming over HTTP and to adaptive streaming over HTTP such as DASH. However, the present invention should preferably keep as much as possible the existing useful features of the adaptive streaming over HTTP. This means that as many as possible of the following requirements should be met:

preserving client-controlled transmission to avoid potential useless (for the client) data being pushed by the server;

preventing the use of specific application knowledge at server side in order to keep the scalability advantage mentioned above;

preserving the way to request the resource and sub-resources in the conventional way in order to keep interoperability and cache-ability between legacy client and/or server that would not implement the invention. For example, in the case of DASH segments, this should avoid the introduction of any request format that would require specific operations (for instance translation of request-URI, etc.) to process the requested segment;

keeping the server-side processing low.

The idea of the invention is to include in a conventional HTTP request requesting first data or resource, optional information that provides hints for the server to determine the additional resource/data or resources the client wishes to receive (using the push mechanism if possible) or that provides hints for the server to determine that the client does not wish to receive any additional resource. In particular, these hints are defined in a way the determination of the additional resource/data or resources does not use contextual information or information external to the request. The HTTP request may be seen as an auto-descriptive request regarding the definition of the additional resource/data or resources.

Examples of such hints are described below and include explicit URI/URL or list of URIs/URLs, implicit URIs/URLs through the use of a construction rule based on the auto-descriptive HTTP request, and filtering rules of resources/data.

A server-side method according to the invention seeks to transmit data between a server device and a client device, and comprises the following steps, at the server device:

receiving, from the client device, an HTTP request to obtain first data, wherein the HTTP request includes first data identifying information allowing to identify the first data on the server device and includes one or more optional header fields allowing to second data;

retrieving and sending the first data to the client device; and if the optional header field is present in the HTTP request:

determining second data identifying information allowing to identify the second data on the server device, using only the optional header field and possibly the first data identifying information. That is the HTTP request is self-sufficient to determine the second resources, i.e. auto-descriptive; and sending a push promise message to announce the push of the second data to the client device and/or pushing the second data to the client device.

According to particular embodiments, acknowledgement data are sent to the client to inform the latter that the server will push second data or additional resources as requested by the client, to inform that the server will not push any second data or additional resource, or to provide hints for the client to determine second data or additional resource/data or resources the server can transmit.

A client-side method according to the invention seeks to transmit data between a server device and a client device, and comprises the following steps, at the client device:

identifying data to be obtained from the server device;

generating an HTTP request to obtain first data from the identified data, wherein the HTTP request includes first data identifying information allowing to identify the first data on the server device and includes one or more optional header fields defining, based only on the optional header field and possibly on the first data identifying information (i.e. only on the content of the HTTP request), second data identifying information allowing to identify second data from the identified data on the server device;

sending the HTTP request to the server device to obtain the first data and to drive the server device to push the second data.

According to particular embodiments, the client, upon reception of acknowledgement data regarding a push request, adapts its strategy to obtain second data or additional resources.

Note that the first data identifying information usually corresponds to the request-URI forming part of the "request-line" of the HTTP request (or its translation into HTTP/2 pseudo-headers).

The approach proposed by the present invention meets all or part of the above requirements.

First, the methods of the invention make it possible for the client to indicate, to the server, one or more additional or related resources to push while requesting data. Since the client will receive these resources without sending specific requests for them, network traffic and latency are reduced.

Also, they make it possible for the client to be informed (through PUSH promise frames) on whether it will receive the additional resources or it will have to request them (depending on server's support of the optional header according to the invention). Thus backward compatibility with existing streaming server is preserved and deployment of the feature should be made easier.

Also, they make it possible for the server to easily identify next resource(s) to be pushed to the client, without requiring application-specific knowledge. Thus, processing at server side is limited, and a large number of clients may be authorized to request the same server.

Figure 3A:
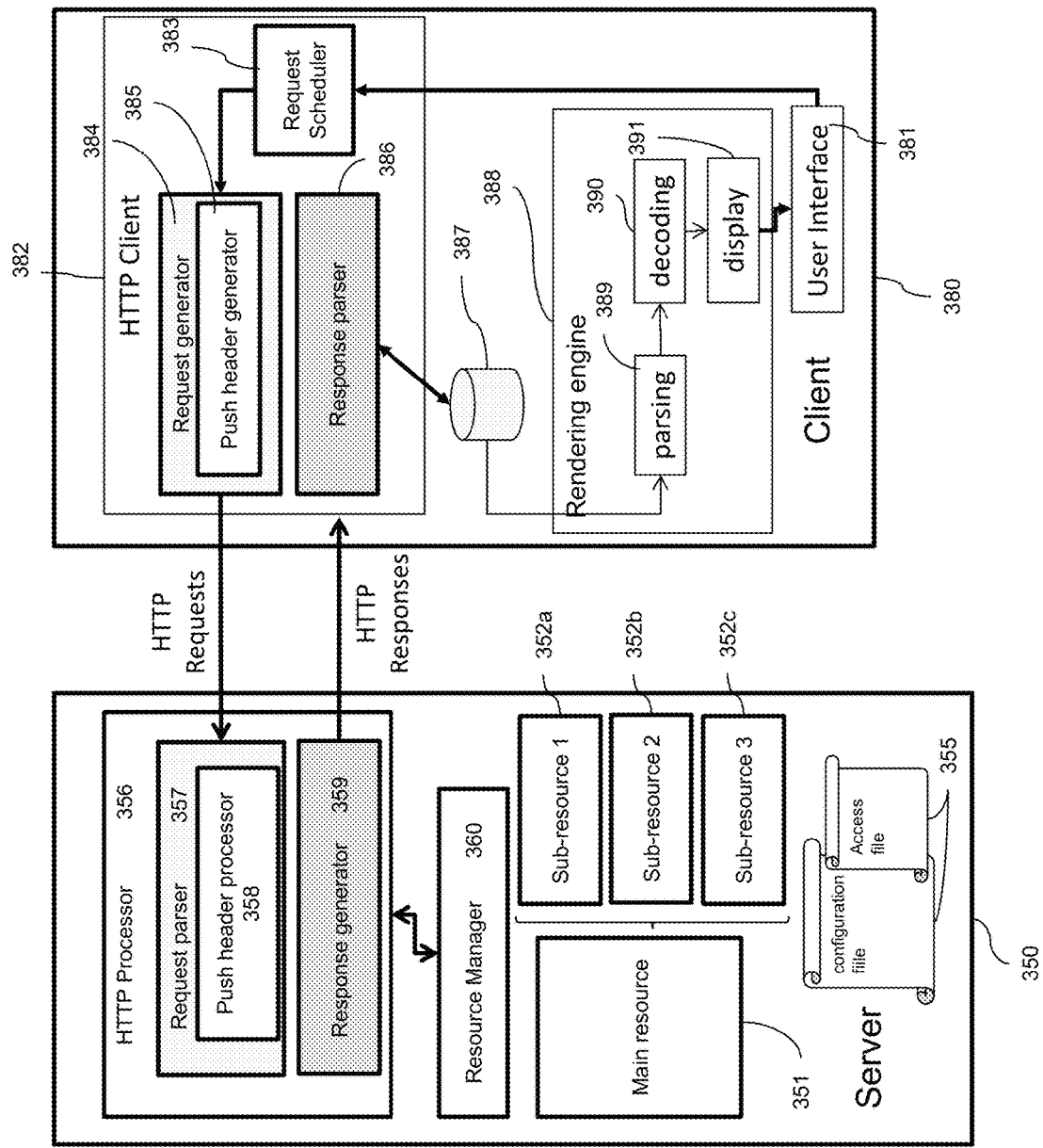
FIG. 3a illustrates a client-server system in which embodiments of the present invention can be implemented.

FIG. 3a shows a generic illustration of a client/server system for the implementation of the invention. Below, reference is indifferently made to "video", "media" or "content" to designate resources, being known that video is a specific case of media or content. Similarly, reference is indifferently made to "MPD" or "manifest" or "streaming manifest" or "HTML page" to designate a description file of the media resource to transmit from the server to the client.

The present invention aims at improving HTTP communication, in particular data streaming, between a client and a server as shown in FIG. 3a, and more precisely aims at lowering both time for resource loading and network traffic overhead.

Server 350 stores resources that clients 380 can download. The resources on the server are categorized into main resources 351 that refer or contain sub-resources (352a, b c).

For example, a main resource can be an HTML page and sub-resources can be css resources, image and/or media files, java script codes or other HTML pages referenced in the main resource. Access rights and organization of these resources can be described in static configuration files 355.

The HTTP requests issued by clients 380 are received and handled by an HTTP processor 356 that includes a request parser 357 to decompose the request into resource identification and header processing.

The invention regards one specific header processing performed by push header processor 358. The latter is in charge of processing one or more specific push header(s), which are optional in the HTTP requests, as described below. As briefly introduced above, from the one or more specific push header(s) and using only the HTTP request, the server is able to produce one or more references to additional resources in order to push them.

Resource manager 360 is in charge of checking the presence/absence/freshness of resources and of providing the requested resources back to the HTTP processor 356. Next, response generator 359 encapsulates these provided resources in one or more HTTP responses (HTTP/1.x) or frames (in HTTP/2) that are sent to the client.

Client 380 has a user interface 381 for users to select, interact with and watch the content handled by several client modules.

User interface 381 translates user clicks into a request for additional content handled by request scheduler 383 in HTTP client 382. The request for additional content may be transformed as a list of resources to download. HTTP client 382 handles the communication with HTTP server 350.

The HTTP client includes request generator 384 to build HTTP requests (HTTP 1.x) or frames (HTTP/2) to request resources to server 350.

According to the invention, HTTP client 382 contains a specific module, namely push header generator 385 that is in charge of inserting, in an HTTP request, the above-mentioned specific (optional) push header indicating the next resource or resources waiting in the request scheduler 383 and/or indicating a push policy, a push strategy or a push directive. According to particular embodiments, a push header may comprise a push type and possibly associated parameters.

Responses or notifications received from the server are handled by response parser 386 which extracts data and stores them in client cache/memory 387. The information conveyed in the response headers is also received and processed by the HTTP Client 311 and can be made available to the DASH control engine 313 (for example, when DASH application is written in javascript code using XmlHTTPRequest).

These data are used by rendering engine 388 that parses (389) the data to dispatch them to appropriate decoding module 390. Based on the data, the latter provides reconstructed data to display 391 for rendering on user interface 381.

According to this invention, parsing module 389 is able to analyze the content of received data to identify any additional resource that is potentially of interest for the user. In such a case, parsing module 389 appends these additional resources in request scheduler 383.

Figure 5A:
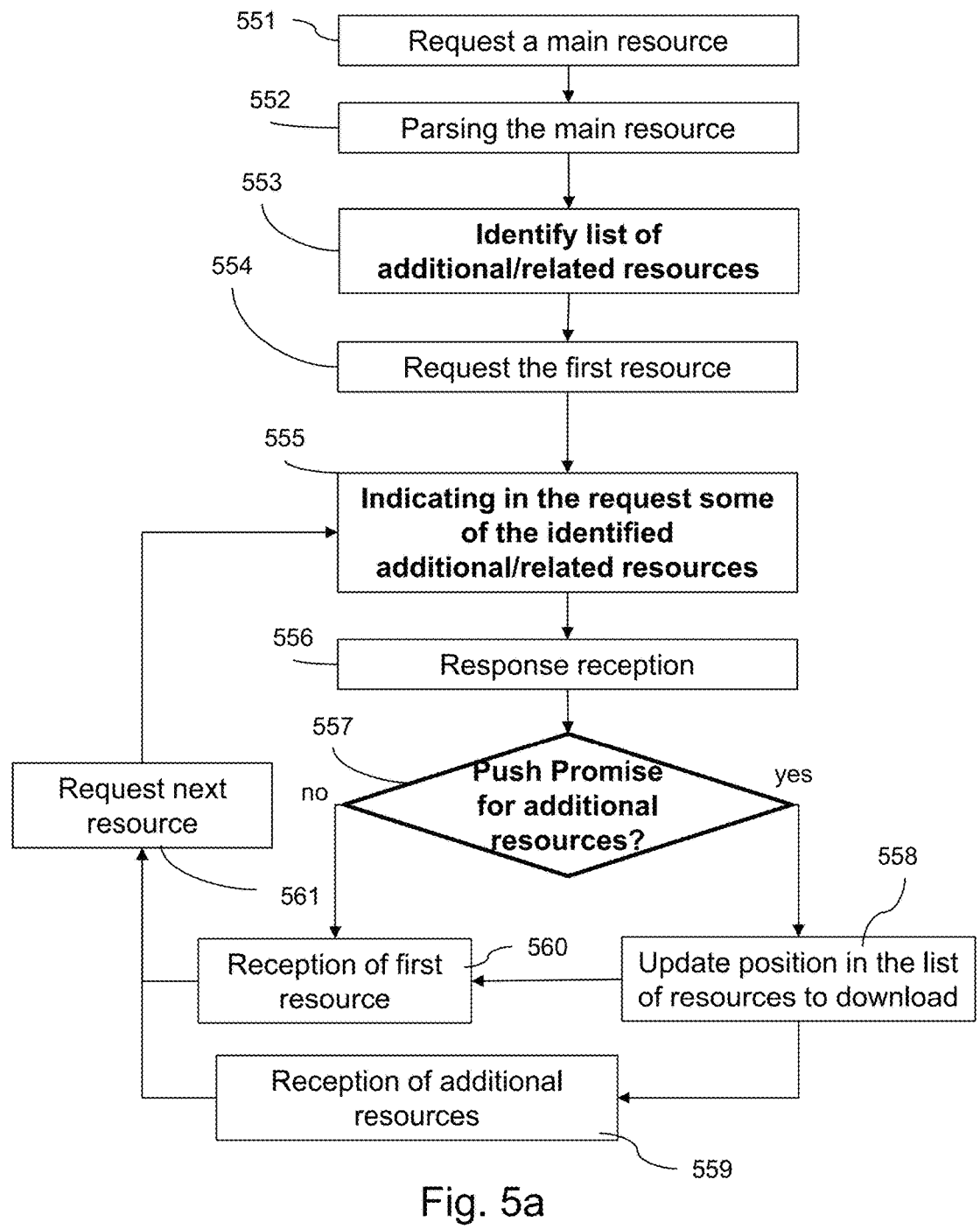
Figure 6A:
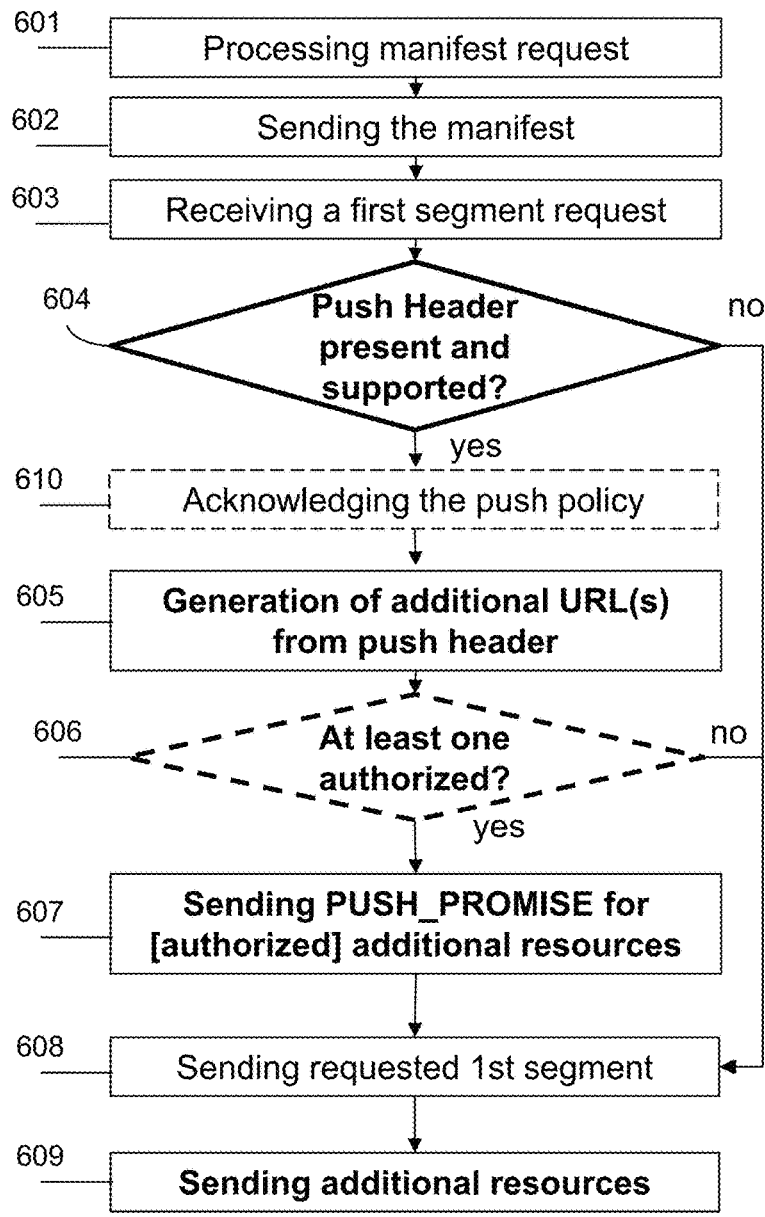
FIG. 6a shows main steps illustrating the server's behavior in the system of FIG. 3a or 3b.

The client's behavior is illustrated in FIG. 5a, while the server's behavior is illustrated in FIG. 6a.

Referring to FIG. 5a, at step 551, the client requests a main resource using an HTTP request, for example a Web page in HTML or a streaming manifest. The HTML code for the Web page is parsed at step 552 (using module 389) so as to identify resources composing the Web Page. Using the outcome of the parsing, the client identifies a list of resources it needs to download to be able to render the whole page. This is step 553, and the list of resources is stored in scheduler 383.

At step 554, the client generates and sends a first HTTP request to obtain the first identified resource from the server. According to the invention, the client (module 385) can also indicate, in the specific push header, a list of additional/related resources it would like to have pushed by the server. This is step 555. Examples of syntax for the specific push header are provided below.

Upon receiving one or more responses from the server at step 556, the client (module 384) checks (step 557) whether or not server notifications announcing the push of data (i.e. PUSH promises) are received. The check can be stopped when the data for the first resource is fully received. This is because no PUSH promise relating to the additional/related resources defined by the specific push header can be sent after the closure of the stream corresponding to the requested first resource. It is recalled here that a server not supporting the specific push header will not send PUSH promise for the additional/related resources defined in this header and will simply ignore the header.

If the check is negative, the data received are only those of the requested first resource. Thus, they are processed by module 384 at step 560 and provided to the rendering engine 388. The process then loops back to step 555, requesting further resources (step 561) stored in request scheduler 383.

If the check is positive, meaning that the server announces it will push some of the resources suggested by the client in the specific push header, the client updates the list of resources to download in request scheduler 382, to withdraw the pushed resources therefrom. This is step 558. The client then processes the data for the first resource (step 560) and the data for the other additional/related resources (step 559), before iterating (step 561 and loop to step 555) until no more resources to download remain in request scheduler 382.

Turning now to FIG. 6a, it is reminded that server 350 uses dedicated "push header" processor 358 to handle the specific push header provided in the HTTP request by client 380. Also, HTTP processor 356 is in charge of parsing the HTTP request and of extracting the various parameters contained in the request, including the URI of the requested first resource and optional header or headers. Thus, HTTP processor 358 identifies the specific (optional) push header via its name and then forwards it to Push header processor 358 for processing.

At step 601, the server received and processes a request from client 380 to get a main resource, for instance a streaming manifest in the context of streaming. It is handled by the HTTP processor 356.

Next at step 602, the server replies by sending the manifest data. At step 603, the server receives a new request from the client requesting a first resource, usually a first resource referenced in the manifest data. This may be a media segment in the context of media streaming.

In this request, the client may also have indicated additional or related resources it is interested in, using the specific push header. Thus, at step 604, the server checks whether or not such a specific push header is included in the request.

If it is included and filled in, the server provides the specific push header to specific push header processor 358. The latter parses the different parts of the push header as described below, to generate one or more references to the additional or related resources indicated by the client. This is step 605.

Optionally, the server may have a pre-configured authorization file which declares for each resource of a list of resources it owns, whether it can push it or not. This authorization file may be traversed at step 606 to validate or invalidate some references obtained at step 605.

The server notifies the client with push announcement messages (e.g. PUSH_PROMISE frames) for only the resources the push of which is authorized according to the authorization file. This is step 607. In HTTP/2, the PUSH PROMISE frames are sent on the stream corresponding to the client's request, with one PUSH PROMISE frame per resource identified at step 605. Step 607 is followed by step 608 in which the server sends the requested first resource (i.e. the first media segment in the context of streaming) to the requesting client.

If the specific push header is not present or not supported (test 604 false) or if no push at all is authorized for the identified resources (test 606 false), then only the requested first resource is sent back to the client at step 608.

Next to the sending of the requested first resource, the server closes the corresponding stream and uses the streams announced via the push announcement messages (PUSH PROMISE frames), unless cancelled by the client, to push the data for the additional or related resources identified at step 605. This is step 609 in which the sending may rely on sending one or more DATA frames.

As described above, according to particular embodiments, acknowledgement data are sent to the client to inform the latter that the server will push second data or additional resources as requested by the client, to inform that the server will not push any second data or additional resource, or to provide hints for the client to determine second data or additional resource/data or resources the server can transmit.

Accordingly, as illustrated with reference 610, the server may add acknowledgement data to a response sent in response to a received request to inform the client that the server will push second data or additional resources as requested by the client, to inform that the server will not push any second data or additional resource, or to provide hints for the client to determine second data or additional resource/data or resources the server can transmit. Example of such acknowledgment data are given by reference to FIGS. 11*a* to 11 *e*.

Figure 3B:
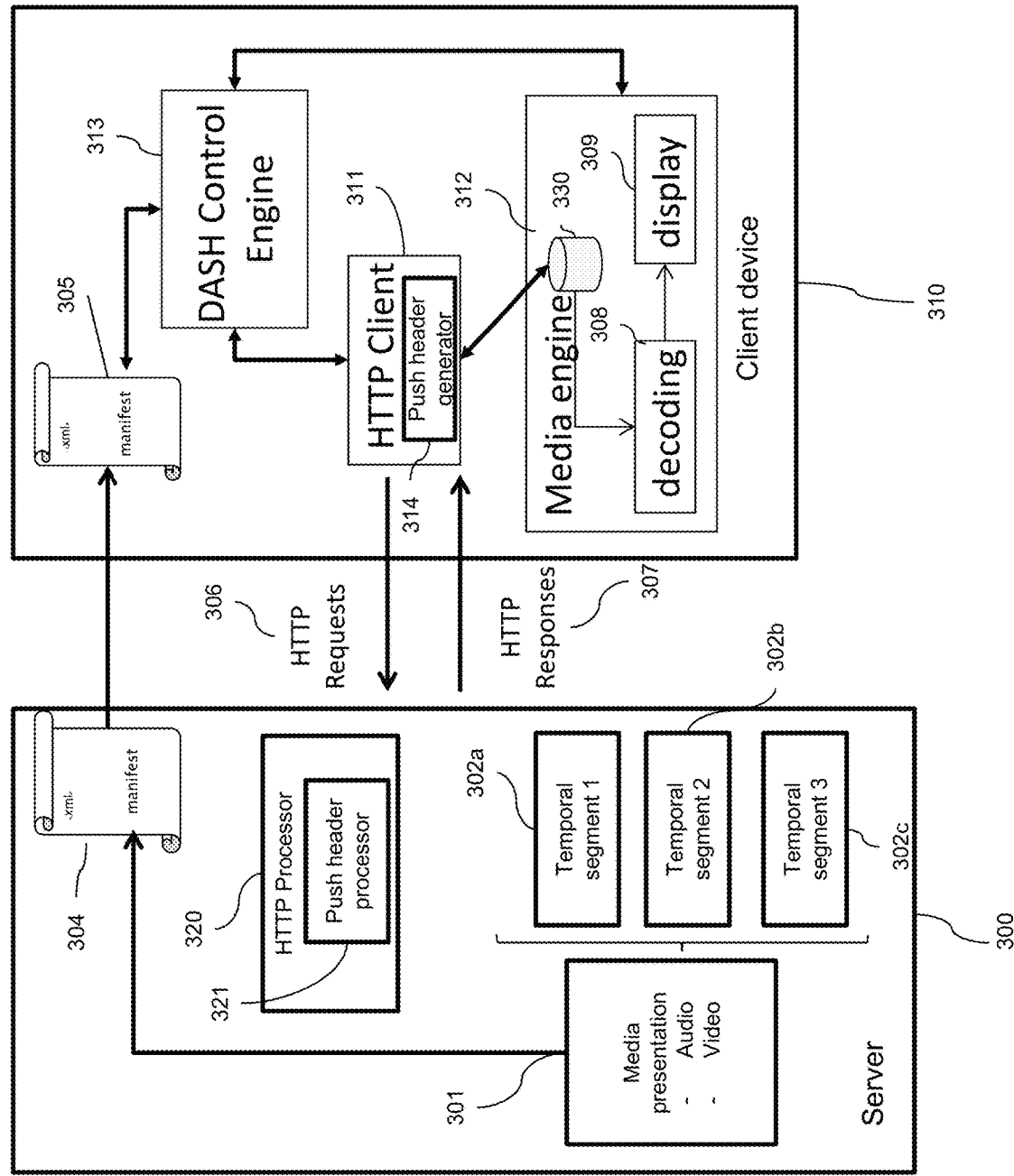
FIG. 3b illustrates a DASH-oriented client-server system in which embodiments of the present invention can be implemented.

FIG. 3*b* illustrates a client-server system in the context of data streaming, for example DASH. The same components as those in FIG. 3 have the same numeral references.

First, in DASH control engine 313 in charge of determining the media segments to download, an additional module is added to communicate with HTTP client 311 the list of next segments to download inferred by a request scheduling module inside DASH control engine 313.

This information is handled in HTTP client 311 by a specific "push header" generator 314. From the list of next segments to download, push header generator 314 is in charge of generating the appropriate syntax for the specific push header, for instance by mapping the list of next segments to download onto the different parts of the specific push header.

The specific push header output by push header generator 314 is supplied to HTTP client 311 for insertion in the current HTTP request.

On server side, HTTP processor 320 and push header processor 321 are similar to HTTP processor 356 and push header processor 358 described above with reference to FIG. 3*a*, but streaming and DASH oriented.

Figure 5B:
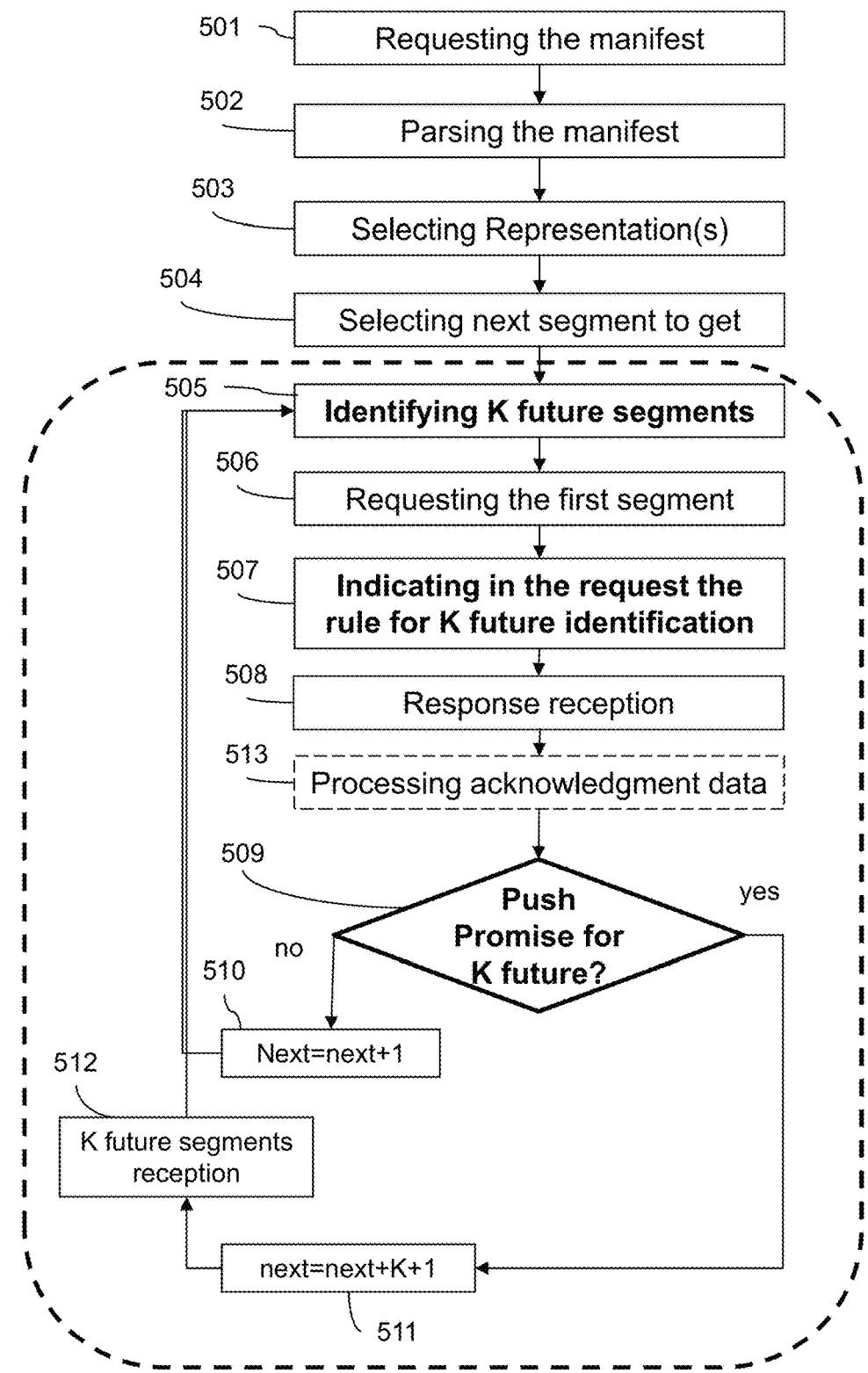
FIG. 5b shows main steps illustrating the streaming-oriented client's behavior in the system of FIG. 3b.

FIG. 5*b* shows main steps illustrating the streaming-oriented client's behavior in the system of FIG. 3*b*.

At step 501, client 310 requests the streaming manifest associated with a wished media, to streaming server 300. Upon receiving the streaming manifest, client 310 parses it at step 502 and then selects a video Representation at step 503.

Iteratively during the streaming of the media, the client selects the next segment to request to the server for download. This is step 504.

Next, step 505 consists in identifying future segments that the client may need. This determination consists for the request scheduler in the DASH control engine 313 to anticipate on the future segments: for example, deciding whether it will switch soon or rather remain at the same Representation level.

In order to anticipate the downloading of next segment or segments, the client may identify a number "K" of future segments (K being set by the client) required for later rendering.

For instance, this may be done directly by parsing a SegmentList in the MPD to retrieve the next K segments from the current one, or by computing the segment numbers for next K segments using a SegmentTemplate provided in the MPD, or by computing next K byte ranges from mp4 boxes when segments are addressed through byte ranges.

However, different selection criteria may be used in the identifying process of step 505.

In the context of adaptive streaming, a selection criterion may involve the client's switching strategy when switching between Representations. For instance, when the client adopts an aggressive switching strategy, K is preferably defined as low (for example corresponding to a number of segments covering less than five seconds) to allow finer switching granularity. On the other hand, when the client adopts a conservative strategy and does not switch too often, K can be set larger (for example to a number of segments covering more than ten seconds).

Still in the context of adaptive streaming, another selection criterion may involve the PUSH PROMISE ability of the server. For instance, if the server cannot promise or send as many segments as suggested by the client in appropriate times, the client can take this information into account to reduce the value of K. It results that less media segments are suggested for push at each time.

Still in the context of adaptive streaming, another selection criterion may involve the pre-fetching strategy of the client. For instance, the client may select the first segments at the beginning of different time periods, for fast seeking purpose. Or if the video application provides information on most popular parts in a video, the criterion may include selecting the first segments corresponding to these most popular parts.

Another possible streaming-oriented selection criterion may result from an analysis of the manifest, MPD. For instance, the client may suggest the server to push segments associated with a selected Representation. This can easily be determined with the associationId between associated Representations. This suggestion can depend on the association Type information. Also, for dependent Representations, segments for enhancement layers can be suggested for push.

More generally in resource download over HTTP, for example Web pages (see FIGS. 3*a* and 5*a*), a client (Web browser, HTML renderer) can analyze the main resource to identify sub-resource(s) referenced in it that it would like to download quickly. By parsing an HTML main resource, the client can for example rely on:
- the <link> elements having a "rel" value indicating "pre-fetching" or "next";
- <link> elements indicating a stylesheet related resource to select for example the CSS resources;
- the <script> elements to select for example sub-resources corresponding to java script codes;
- the media elements like <img> and/or <video>.

From these elements potentially declared in an HTML page, the client can select the list of URIs through their "href" attribute. This list of URIs can be placed in one or more specific push headers, for example on per type of resource or concatenated in a single header as a list of URIs or organized as a list with priorities similar to the "q" value in the well-known Accept HTTP header.

After step 505 selecting and identifying K additional or related resources, the client generates an HTTP request to obtain the next segment identified at step 504. This is step 506.

The URL of the next segment or the SegmentBase URL with a byte range are used to form an HTTP request (in addition to the HTTP method to form the request line).

According to this invention, an additional step 507 consists for push header processor 314 of HTTP client 311 in obtaining the list of future segments (i.e. additional resources) determined by DASH control engine 313 at step 505 and in setting the specific push header to define those future segments.

Several ways to declare those future segments the client wants the server to push can be implemented as described below.

Once the HTTP request is ready, including the request line for the next segment and including the specific push header for suggesting push of additional segments, it is sent to the server 300 by HTTP client 311, still at step 507.

Upon receiving a response from the server at step 508, the client checks whether or not the server sends push announcement notifications indicating that it will take the initiative to send the additional segments defined in the specific push header. The check is step 509.

The push announcement notifications can be done for example in HTTP/2 with one or more PUSH_PROMISE frame(s), one per future segment.

If the data for the requested next segment selected at step 504 is fully received (the corresponding stream is closed by the server) and no push announcement notification has been received (test 509 false), then HTTP client 311 informs the DASH control engine that the next segment to request is the immediately following one. This is step 510.

Otherwise (test 509 true), the next segment to request using a new HTTP request is the one immediately following the last segment promised to be pushed. The update at client side is performed at step 511. In the meantime, data for the K future segments are received by the HTTP client from the server, at step 512.

Next to step 510 and 512, the process loops back to step 505 in order to iterate the process until the streaming stops.

Alternatively, client 310 can implement, in HTTP client 311, the handling of the K future segments to obtain. In such implementation, this is the HTTP client that is in charge of determining the next segment(s) to download. Pushed data received by HTTP client 311 would then fill the client cache (307) in advance for the DASH control engine 313 so that when requesting the next segment, the perceived latency at the DASH application level is reduced.

According to particular embodiments, the client, upon reception of acknowledgement data regarding a push request, processes the received acknowledgment data (step 513), for example to adapt its strategy to obtain second data or additional resources. Example of processing such acknowledgment data are given by reference to FIGS. 11a to 11e.

Turning now to the syntax of the specific push header, as every HTTP header, it is identified by a {name, value} pair, wherein the name and the value are separated by a colon ':'.

The header name can be for example "Push-Request", or any other name provided that it does not conflict with another existing header name. If it is an application dedicated header, the name can start with the application name: for instance "DASH-Push-Request" or "HTML-Push-Request" to match different cases.

Below, a generic header is considered without application-related prefix.

The goal of the specific push header is to define and thus provide (to the server) one or more unique resource identifiers (URIs) or locators (URLs) or the like, identifying additional resources or part of resources of interest for a client requesting a first resource. As provided by the present invention, the HTTP request must be self-sufficient to determine those additional resources, i.e. without external or contextual information.

Various embodiments to define the additional resources or part of resources can be contemplated.

In embodiments, the specific push header explicitly includes the URIs or URLs identifying these additional resources. For instance:

<Push-Request: HTTP://server/path/segment-2.mp4>

Figure 6B:
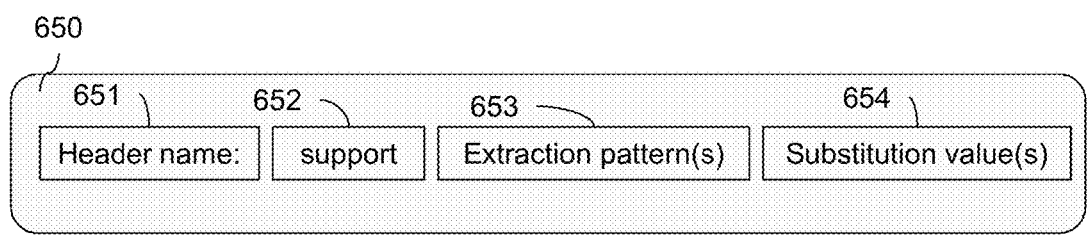
FIG. 6b illustrates an exemplary structure of a push header according to the invention.

In other embodiments, they are indicated through a construction rule, which rule is inserted in the specific push header. In other words, the list of additional resources of interest is expressed as a construction rule. The syntax of the specific push header may be as shown in FIG. 6b.

The header value of header 650 is made of three distinct parts separated by a reserved character, for example ';'.

First part 652 is a "support" that defines on which part of the HTTP request the construction rule defined by the two other parts has to be applied. In particular, such URI or URL may be all or part of the request-URI set in the HTTP request.

The word "support" can thus refer to the initial request-URI itself, but can also refer to another HTTP header present in the HTTP request.

Second part 653 defines an extraction pattern from the support, i.e. a varying part of the URI or URL referred to by support part 652.

For instance, the varying part in the request-URI or the like may be explicitly indicated using reserved characters. In a variant, the varying part may be expressed as a regular expression indicating the part of the request-URI or the like to extract and modify.

Second part 653 thus comprises varying-part information and can take the form of an URI template.

When the support is another HTTP header, there may be no extraction pattern to indicate or, as for example 880 (see below), the whole header value is indicated as the pattern to substitute.

Last part 654 optionally contains one or more substituting values to apply as replacement of the varying part defined by second part 653.

Substituting values can be defined using a colon-separated (or any dedicated separator) list of values or a range of values or even a list of ranges. In such case, push header processor 321/358 should iterate over the list or range(s) of values to deduce as many URLs as substitution values.

For instance, when first and second parts are merged:
<Push-Request: HTTP://server/path/segment-(1).mp4; {2-5}> where {1} define the varying part and {2-5} are the substituting values.

Another example having three distinct parts is as follows:
<Push-Request: request-URI; segment-{1}.mp4; {2-5}> where "request-URI" is the support, "segment-(1).mp4" is the part of the URI defined by the support that has the varying part {1}, and {2-5} are the substituting values.

An issue is to build a construction rule as generic as possible. Exemplary key aspects for such building are provided in the context of adaptive streaming.

Various ways to describe media segments or media content subparts are provided in DASH: SegmentTemplate, SegmentBase or SegmentList, only one of these three being present at a time in a Representation, AdaptationSet or Period element.

SegmentTemplate is the most convenient way to easily build URI templates for the client to provide hints to the server on the next segments it would like to download. This is because SegmentTemplate clearly indicates which part of the segment URL defined in the manifest is about to vary, for example depending on representation's unique identifier or representation's bandwidth, etc. In this case, identification of the K future segments by the client requires no more capabilities than the standard template resolution process, available in the DASH control engine 313.

This is the case of the example of FIG. 7a. From the URI template "mp4-live-$RepresentationID$-$Number$.m4s", it is easy to define a construction rule designating the K segments after current segment N of the same Representation "h264bl_low":
<Push-Request: "mp4-live-h264bl_low-{1}.m4s"; {(N+1)-(N+K)}>

For SegmentList approach, the client can pre-process the MPD file in order to identify repeating patterns between the URIs of the segments listed, and then deduce a generic rule to represent the list of segment URLs.

Alternatively, an MPD analyzer can do this work offline and annotate the SegmentList with a new element, attribute or descriptor to provide the URI template that could be used. This is to accelerate the processing at client side. As an element or attribute, the URI template could be defined inside the SegmentList element. As a descriptor, it could be defined in the parent element of the SegmentList (for example at Representation element level).

FIG. 10 provides an MPD sample 1000 using a SegmentList element for the description of the segments. The SegmentList contains an enumeration of SegmentURL elements. In this MPD sample, two alternative representations 1002, 1003 for the same video content are described within the same AdaptationSet 1001.

By parsing the list of SegmentURL in each Representation, the client can easily determine that the URLs are largely constant, except a segment index.

Then, an annotation like the exemplary URI templates provided in 1005 and 1006 can be added to the parent Representation element (since at most one SegmentList per Representation). Thanks to this annotation (in @templateURI attribute), a client willing to indicate one or more segments in the list as to be pushed would just have to copy and paste the @templateURI value in the specific push header.

To further simplify the use of URI template for the client, one may to check which parts of the obtained @templateURI 1005 and 1006 vary from one Representation to the other. This is because, in the present example 1000, there are multiple Representations in the same AdaptationSet. This leads to the generation of another template attribute, this time at AdaptationSet level with multiple variables or varying parts (see 1007).

From one level to the next level, it is thus possible to progressively generalize the @templateURI attribute. Thus, the generalization process may be iterated over Parent element(s) until the segmentURL values remain quite similar.

As for @templateURI annotation 1007, it may happen that a URI template contains multiple variables or varying parts. In such a case, it is up to the client to determine in which order the varying parts have to be successively considered for replacement by their respective substituting values. The client may thus associate each varying part with a priority level so to force the server to follow a predefined order when considering these varying parts.

Optionally, in addition to the @templateURI attribute, an @template Value attribute may also be provided to indicate the range of possible values for the one or more varying parts of the @templateURI attribute. The range of possible values is determined based on the MPD, i.e. on the list of SegmentURLs in the example of FIG. 10.

For example, in addition to annotations 1005 and 1006, a @template Value attribute could be declared with each of annotations 1005 and 1006 to define the same value range: @templateValue="{1-6}".

For the @templateURI added at AdaptationSet level, the @template Value attribute would take the following values: @templateValue="low:hd;{1-6}" with 'low' and 'hd' string of characters listing the possible values for the first variable "level" corresponding to the representation identifier and range {1-6} listing the possible values for the second variable "nb" corresponding to the segment index.

Back to the syntax of the specific push header as shown in FIG. 6b, an embodiment uses the following grammar and the RFC 6570 on URI template to express the extraction pattern(s) 653 when describing the specific push header.

The "push header" may be defined as follows:
push_request="Push-Request:" header_name ";" uri_template*(";" definition) with header_name="URI"| HeaderName HeaderName corresponds to a pre-defined header name in the specification of the different HTTP versions.

uri_template parameter is a URI template as defined in RFC 6570 potentially with extensions. This template may contain variables or varying parts, defined between curly brackets and whose names are numbers. For example: /server/video{1}.mp4 is a uri_template with one varying parameter and/server/{1}/image(2).jpg is another uri_template but with two varying parameters.

The simplest case corresponds to a uri_template equal to {1} meaning that the whole support should be replaced with the declared definition, i.e. substitution value. As well, a uri_template without any declared variable means that the whole support 652 should be replaced by the uri_template value. For example if support="URI" and uri_template="/server/resource2.ext" the specific push header indicates that the URI for suggested resources by a client is/server/resource2.ext" without any further processing.

The last optional definition parameter declares one or more substituting values. The first definition corresponds to the substitution value(s) for the first variable of the uri_template, the second definition to the second variable on so on. There must be as many definition parameters (i.e. sets of substituting values) as uri_template parameters (i.e. extraction patterns).

Thus, such "definition" includes value(s) and/or list(s) and/or range(s):

definition=value|list| range where value is a first possibility to express substituting values, as a string of characters;

list=value|range*(":" value|range) is a second possibility to express substituting values as a colon-separated list of values (or range of values). Note that the colon character is chosen in preference to the comma character to separate the values, since the comma character is conventionally used for separating several values for the same header;

range="{" start "-" end "}" is a third possibility to express substituting values as a range. This should be interpreted as the list of all the values between 'start' and 'end', with both 'start' and 'end' included. This is only possible for values that are integers.

The formatting of a variable value inside the definition parameter is the default one. To prevent any formatting issue for range of values, the formatting of a value in a range should follow the formatting of the start and end values, in particular for leading zeros. For example, if the range is specified as '{8-10}' then the generated values are: '8, 9, 10'. If the range is specified as '{08-10}', then the generated values are: '08, 09, 10'.

As briefly introduced above with reference to annotation 1007, the specific push header may include an URI template having two or more varying parts (i.e. variables). The order in which the additional resources defined by the specific push header will be pushed by the server directly depend on how the two or more varying parts are successively considered (i.e. expanded) by the server. Thus, this order should be deduced from the specific push header.

An exemplary algorithm for expanding variables in an uri_template rule is as follows, assuming that an order of the variables is provided:

1. Obtaining of the list of uri_templates
   for the first variable expansion (first according to the provided order), the uri_template defined in the specific push header is used.
   for subsequent variable expansion(s) (according to the provided order), the list of uri_templates resulting from the expansion of the previous variable(s) is used.
2. Each uri_template in the obtained list is replaced by a list of uri_templates obtained as follows:
   for each value of the variable considered in an expansion step, the uri_template is duplicated and the variable inside the URI template is replaced by one of the substituting value.

This means that, in the final list of URIs (or of header values), the variable first in the order (e.g. defined by '1') varies the most slowly and the variable last in the order (i.e. defined by the largest number) varies the most quickly.

For example, construction rule <'Push-Request: URI; {1}-{2}; a:b; 1:2'> leads to the following ordered list:
'a-1'
'a-2'
'b-1'
'b-2'

Construction rule <'PushRequest: URI; {2}-{1}; a:b; {1-3}'> leads to the following ordered list:
'a-1'
'b-1'
'a-2'
'b-2'
'a-3'
'b-3'

Alternatively, the processing and substitution order for multiple variables can be expressed as a specific operator. The RFC 6570 reserves some characters for operator extension. In one embodiment, the '@' character may be used to indicate an order: the greater the value of the operator, the greater the processing order. The two above examples, in this alternative embodiment, would become:

Construction rule <Push-Request: URI; {foo@1}-{bar@2}; a:b; 1:2> with "foo" and "bar" being variable names respectively substituted with values "a" and "b" and "1" and "2" in the following order:
'a-1'
'a-2'
'b-1'
'b-2'

Construction rule <Push-Request: URI; {foo@2}-{bar@1}; a:b; {1-3}> would lead to the following ordered list:
'a-1'
'b-1'
'a-2'
'b-2'
'a-3'
'b-3'

Although examples above use a single specific push header in the HTTP header, other embodiments may use two or more push headers.

For instance, when a client is interested in several resources of different types and/or when it is too difficult to provide a construction rule, then it may decide to use multiple instances of the specific push header.

As an example, if acceleration of the download of a Web page is sought, the client can generate one push header per kind of sub-resource composing the Web page: one for images, one for stylesheets, one for script codes, and so on.

In such situation, the value of each specific push header behaves like a filtering parameter that filter some types of sub-resources. Note that the main resource in which the sub-resources are referenced may be the resource that is explicitly requested by the HTTP request (i.e. the resource of request-URI).

Having multiple instances of the push header would lead to additive lists of URI/URLs, each instance defining a separate set of resources to push.

Another case justifying multiple instances of the specific push header includes when the client wants to modify parts from different supports in the initial request: for example a part of the request-URI and also a byte range value in the Range header or when indicating modification of two distinct headers. In such situation, the client may put two (or more) specific push headers: one for the URI modification and the other for the Range modification. The processed headers would then lead to a combined instance with new URIs and associated new byte ranges.

To be noted that for multiple header modification based on multiple push header, each push header processing generate a set of URI/headers corresponding to the corresponding substituting values: and the final list of resources is obtained by providing all the possible combinations of the generated sets, i.e. all the possible combinations between the substituting values for each URI/set of headers.

In embodiments, the specific push header may be used for alternatives to a uri_template specification.

When the uri_template parameter indicates a relative URI, the push header processor has to consider the relative path from the original request-URI to construct an absolute URI.

However, in embodiments, the base URI or another base URI could be specified either in another specific header or as a parameter inside the Push-Request header. This can be useful for example in DASH where multiple BaseURL are declared in the manifest. So, if a client wishes some resources to be pushed, it could test a first server using a first base URL with the specific push header, and if no push promise is received, it may change the baseURL in a next request to test whether the second server supports the specific push header.

An exemplary way to indicate a change of base URI in the specific push header includes an additional parameter, "var_base", set after the uri_template parameter. The var_base parameter declares the new base URI value.

For instance, if the request line of the HTTP request is
GET/server1/video/segment-1.mp4,
the specific push header may be as follows
<Push-Request: URI; segment-(1).mp4; {2-4}; var_base=/AnotherServer/video/>
This construction rule generates the following list of additional resources:
http://AnotherServer/video/segment-2.mp4
http://AnotherServer/video/segment-3.mp4
http://AnotherServer/video/segment-4.mp4

Alternatively, instead of using URI-template RFC 6570 to declare the uri_template parameter, regular expressions can be provided instead.

In embodiments that deal with interoperability purpose, the specific push header is split into two distinct headers:
 a first one to indicate the resources of interest for the client. This is the specific push header as described above;
 a second one to indicate to the server that the client accepts server push. While this can be negotiated at connection setup, it may be useful for the client to tell the server when it may accept pushed data and when there is a higher risk of cancelling the push (for example when the client experiences no well-established video mode with frequent switches).

This second header would also be useful for network intermediaries (for example in a CDN) not supporting push: they could still interpret the first push header as a hint to pre-fetch some resources close to the network edge.

The specific push header of the invention may help streaming clients to improve different DASH situations:
 for instance, when the client wants to anticipate on next segment;
 or when the client wants to seek to a time offset in a video;
 or when the client trusts the server to send the following segments on a given period of time;
 or when the client tries to anticipate on a switch;
 or when the client is interested in associated resources;
 or when the client requests non-multiplexed audio-video segments. In such case, when requesting video segments, it may indicate interest for corresponding audio segments.

In another embodiment, the substituting values could be put in another dedicated header ("Push-Values" below) then leading to the following set of headers (header names here are just examples):
Push-Request: header_name ";" uri_template
Push-Values: definition [*(";" definition)]

With this another embodiment, example 850 described below would be rewritten into:
GET/server/video/Rep-R1/segment-01.mp4
Push-Request: URI; segment-{1}.mp4;
Push-Values: 02:10
As well, example 865 described below would become:
GET/server/video/Rep-R1/segment-01.mp4
Push-Request: URI; Rep-{1}/segment-{2}.mp4
Push-Values: R1: R2; {01-03}
Alternatively, when more than one variable parameter is declared in the push specific header, substitution values for each variable parameter can be declared in its own "Push-Values" header. In such case, "Push-Values" header should contain the variable parameter name followed by the value or a list of value or a range of values. For example:
GET/server/video/Rep-R1/segment-01.mp4
Push-Request: URI; Rep-{var1}/segment-{var2}.mp4
Push-Values: var1=R1: R2
Push-Values: var2={01-03}
Other exemplary rewritings can easily be deduced from the above rewriting examples.

In another alternative, each part of the push specific header illustrated on FIG. 6*b* may be put in a corresponding separate header; for example (header names are just examples):
Push-Support: URI
Push-Pattern: segment-{var}.mp4
Push-Values: var=02:10
With reference to FIGS. 7*a*, 7*b* and 8, it is now described examples of specific push headers for DASH using URI templates.

Figure 7B:
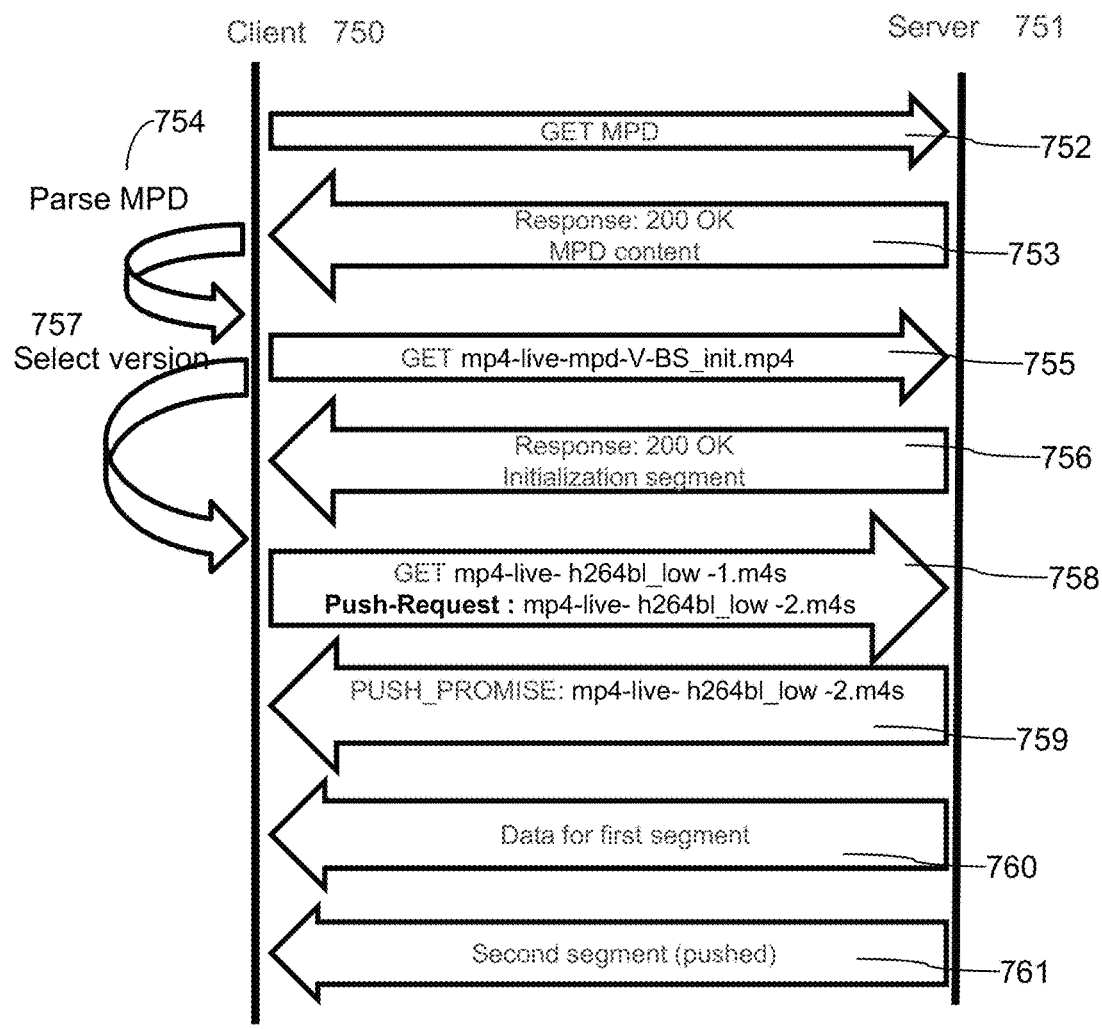

FIGS. 7*a* and 7*b* provide an example of use of the invention in the context of adaptive streaming over HTTP using DASH standard. FIG. 7*a* is an example MPD 700 containing a SegmentTemplate element 701 indicating to the streaming client where (i.e. URI) to download each media segment. The client can select between two alternative video Representations 702 and 703 depending on wished or possible spatial resolution and bandwidth.

FIG. 7*b* describes the client-server exchanges when the invention is implemented, and assuming that the client and the server communicate using HTTP/2.

Client 750 first requests the MPD, streaming manifest, to server 751 via an HTTP GET request at step 752. The server sends an HTTP response to return the MPD file to the client at step 753.

Upon MPD reception, the client parses it at step 754 to identify initialization information to setup its media decoders.

Next at step 755, the client sends another HTTP GET request to obtain this initialization segment. The server provides, in an HTTP response, the requested initialization segment file. This is step 756.

In the meantime or consecutively (step 757), the client identifies the appropriate Representation according to its preferences/Characteristics. This step makes it possible for the client to identify the first media segment needed to start reading the video, but also the next segments to download to continue reading the video (if no Representation switching decision is taken), usually the following media segments in time from the same Representation. The client can deduce the URI(s) for this/these following segment(s), using the manifest.

Next at step 758, the client requests a first media segment to the server in order to start displaying the video.

Using the present invention, the client inserts, in request 758, the URI(s) for the next media segments to download.

This insertion is made in the dedicated HTTP push header (for example the "Push-Request" header in request 758). Examples of values for this specific HTTP header are provided below with reference to FIG. 8.

In response to request 758, the server that supports the invention and thus understands the specific push header can notify the client that it understands the push header and announces that it (server) will take the initiative of pushing the data to the client. This is the object of the PUSH PROMISE frame 759 sent by the server that provides a server-initiated stream identifier to the client.

The server also sends the requested first segment, object of the GET request in one or more DATA frames 760 with the stream identifier of the GET request 758 as stream identifier.

Finally, in reference to the server-initiated stream identifier exchanged in step 759, the server pushes through one or more DATA frames 761 the data corresponding to the media segment indicated in the specific header of request 758.

According to particular embodiments, the server acknowledges pushing requests from the client, i.e. requests for pushing identified additional resources, requests for using an identified pushing policy, strategy, or directive, or request for not pushing any additional resource. Such an acknowledgment can be transmitted in an HTTP header of a push promise message. It makes it possible for the DASH response header processor 386 to inform the DASH control engine 313 about the push policy used by the server.

FIGS. 11a to 11e illustrates several examples of push policy management between server 1101 and client 1100, enabling server 1101 to acknowledge reception of a push policy received from client 1100 and to inform the latter of the push policy it will apply or it may apply. These examples are based on adaptive streaming on HTTP (methods based on a streaming manifest), like MPEG DASH.

Figure 11A:
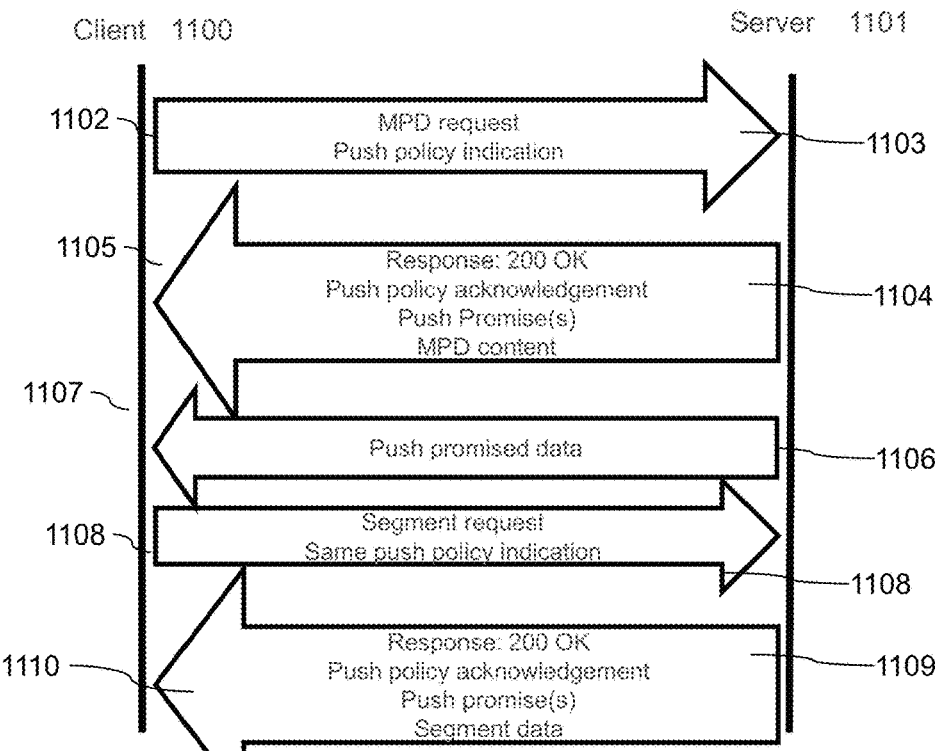
FIGS. 11a to 11e illustrate examples of acknowledging a push policy notification within a server.

FIG. 11a illustrates the transmission by client 1100 of an indication of a push policy in initial request 1102 for the streaming manifest (MPD in case of DASH). As described previously, this indication can be conveyed via a dedicated HTTP push header.

Upon reception, server 1101 processes the request at step 1103, i.e. the server identifies the resource (MPD) to be provided to client 1100. Then, server 1101 prepares its response at step 1104 with the return code for the initial request referenced 1102. Accordingly, if the requested resource is available, the return code is the HTTP code 200.

In parallel, server 1101 processes the push policy indication contained in the dedicated HTTP push header. If the server can understand the header and if it can handle the suggested push policy, it then acknowledges the push policy suggested by the client. This can be done by adding acknowledgment data in response referenced 1104, for example by adding the same dedicated HTTP push header with the same policy value as in request referenced 1102 (in such a case, the push acknowledgement data are the same as the puch policy data).

This indicates to the client that the server is willing to use the suggested push policy.

Accordingly, in such a case, after acknowledging push policy in response referenced 1104, the server starts announcing additional data that it intends to push to the client. This can be done, for example, by using PUSH_PROMISE frames from HTTP/2 (in the case of DASH one PUSH_PROMISE frame per segment).

It is to be noted that the server preferably includes the data requested by the client in request referenced 1102 (i.e. the MPD file) in its response referenced 1104, on a standard basis.

While the so-generated HTTP response referenced 1104 is sent back to the client and processed by the client at step 1105, the server starts preparing (step 1106) the data streams used to send the announced additional data to the client (typically, in HTTP/2, one DATA frame per promised resource, i.e. a segment in case of DASH)).

Finally the client starts receiving the first segments for the media presentation during step 1107 while processing the MPD sent in response to request referenced 1102 thus saving network traffic and reducing transmission delay.

It is to be noted that alternatively, the acknowledgement data sent by the server can be signaled through another dedicated HTTP push header with a simple value like "OK" for example.

It may be recommended for a server implementing embodiments of the invention to acknowledge the push policy suggested by the client when the server supports it and applies it. Indeed, this is relevant information for the client to easily decide whether or not accepting PUSH_PROMISE frames sent by the server.

Following this first roundtrip between the client and the server, the client keeps on submitting requests to continue the streaming of the media presentation (step 1108), for example with a request for the segment that follows the ones pushed during steps 1106 and 1107. Within this request, the client can confirm it is maintaining the same push policy by adding in the request referenced 1108 a dedicated HTTP push header having the same push policy indication as in the previous request.

At the server end, processing the received request (step 1109) leads to a response acknowledging the availability or not of the requested resource (e.g. HTTP status code 200 OK) and acknowledging the push policy it is applying with the dedicated HTTP push header and to transmitting an announcement of additional data to be pushed and the requested segment data (the actual push of data is not represented but follows the response 1109).

Figure 11B:
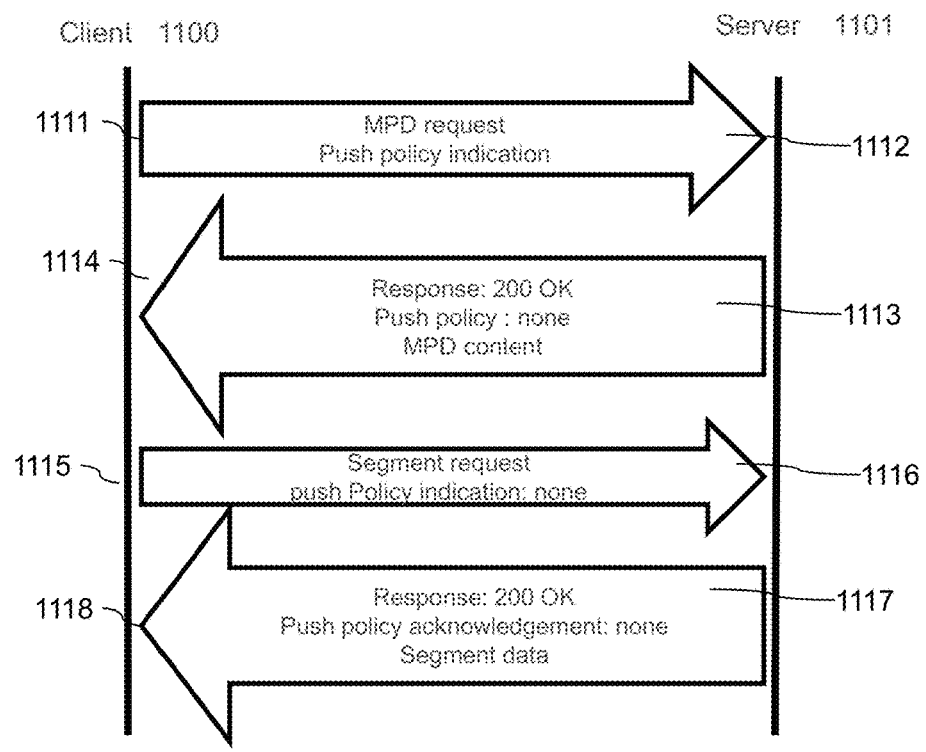

FIG. 11b illustrates an example of acknowledging a push policy notification, according to which the server informs the client that it cannot implement the push policy suggested by the client.

In the case according to which the server does not support the push policy indication suggested by the client, it can simply ignore it.

However, it may be useful that the server warns the client that it will not use any push policy. This is useful information for the client in order to schedule its future requests. Indeed, the client will have to request all the segments one after the other.

Figure 12A:
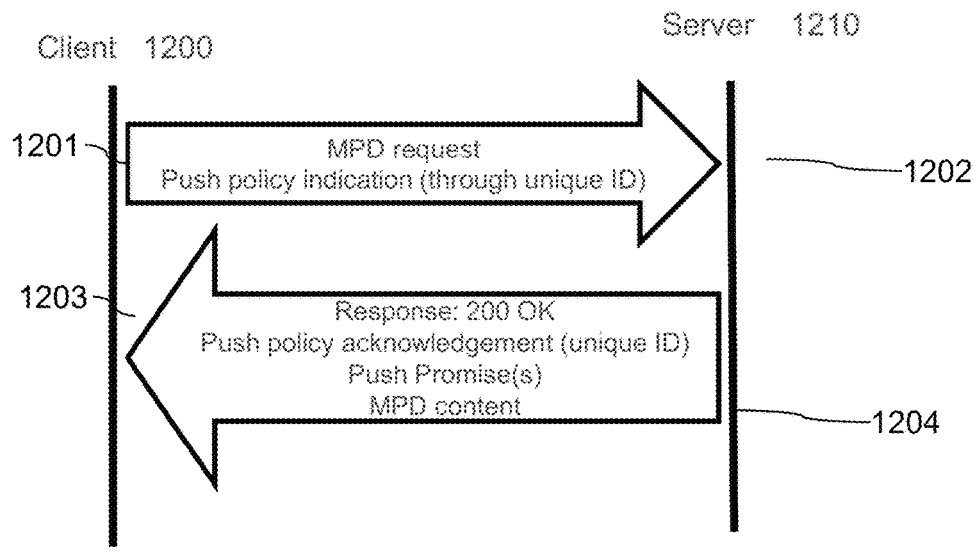
FIG. 12a and FIG. 12b illustrate an example of exchanging information relating to push policies between a client and a server based on unique identifiers.
Figure 12B:
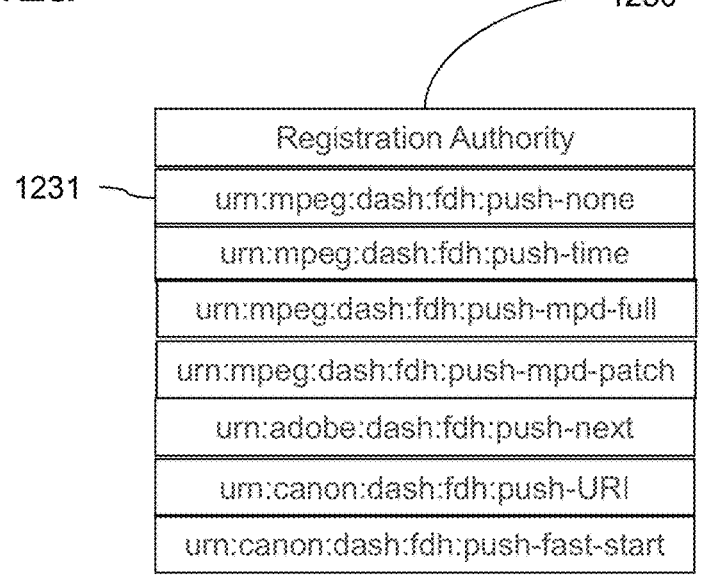

To that end, the server can use a specific push directive indicating that no push is done, for example a push policy of type "push-none" and without any value (or the one registered as reference 1231 in FIG. 12b).

As illustrated, a first step is directed to the transmission by client 1100 of an indication of a push policy in initial request 1111 for the streaming manifest (MPD in case of DASH). As described previously, this indication can be conveyed via a dedicated HTTP push header.

Upon reception, server 1101 processes the request at step 1112, i.e. the server identifies the resource (MPD) to be provided to client 1100. Then, server 1101 prepares its response at step 1113 with the return code for the initial request referenced 1102. Accordingly, if the requested resource is available, the return code is the HTTP code 200.

Since it is assumed in this example that server 1101 cannot implement the push policy suggested by the client, server 1101 indicates to the client that the server will not use the suggested push policy. This can be done by using a specific push directive indicating that no push will be done as illustrated in FIG. 11b (reference 1113).

When receiving such information (step 1114), client 1100 knows that it will have to request all the segments one by one from step 1115.

Optionally, it can confirm that it does not count on any resource pushed from the server by also setting in the dedicated HTTP Push header the same "no-push" policy indication in its request (as illustrated with 1115).

Then, server 1101 processes the received request in step 1116 and replies to that request in step 1117 by acknowledging the "no-push" policy and by transmitting the data corresponding to the request. These two steps are repeated until the end of the streaming session.

Alternatively, the server could use another dedicated HTTP push header with a reserved information code (for example 103, to inform the client about the "not supported push policy mode").

Still alternatively, the client could indicate its push policy through the HTTP Expect header, the server then indicating a 417 code for "Expectation failed" or more clearly a reserved 4xx code dedicated to the non-support by server of a push mode wished by the client.

In another embodiment, the client implementing embodiments of the invention does not know whether the server supports or not the invention. If the client decides to keep the full control and sends a "no-push" push policy to the server, no acknowledgment is sent back by the server since it does not understand the header.

In other embodiments according to which the server implements the invention but the client does not support it, the server that does not receive any dedicated HTTP push header in the client's request can however acknowledge using the "no-push" policy indication so as to warn the client that nothing will be pushed (because the server does not know whether the client supports or not the invention or simply forgot to indicate its preference). By doing so, the server does not take the risk of sending useless data.

The purpose of such a specific "no-push" policy can be used, in particular, to indicate the following:
the client is not interested in any push; or
the client would like to interrupt the push for some requests.

This provides finer control than the existing SETTINGS_ENABLE_PUSH setting parameter defined by HTTP/2, which can be used by a client to indicate to the server whether the usage of server push is permitted. This setting parameter does not provide any fine-grained negotiation or control mechanism regarding server push. It may indeed be useful for the client and the server to have such negotiation means. For example, although the value of the SETTINGS_ENABLE_PUSH setting parameter allows the server to use server push, a client may want to disallow server push for some or all requests inside a streaming session. For instance, this can be useful for clients when loading a Web page embedding a video element. Clients may be interested in having the resources associated to the Web page (CSS, images, JavaScript) to be pushed but not the media segments. In such a case, pushing data would be enabled for the whole connection but for a specific DASH content, the client would indicate its preference to the media server for no pushing data.

Figure 11C:
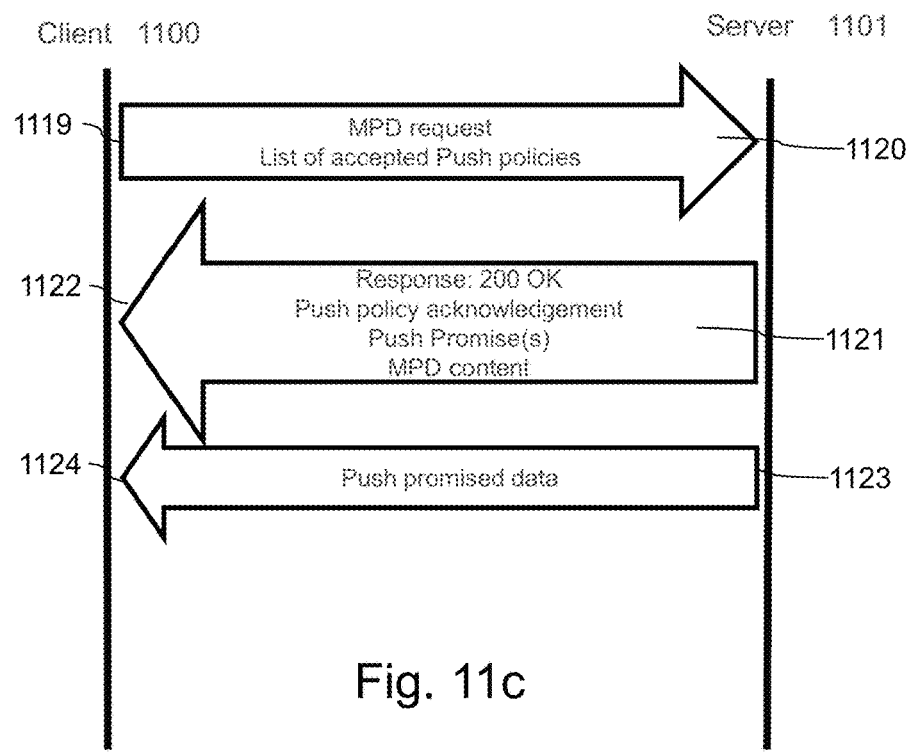

FIG. 11c illustrates an example of acknowledging a push policy notification, according to which the client suggests several push policies in the initial request for a streaming manifest. In other words, instead of suggesting one single push policy as described by reference to FIGS. 11a and 11b, the client transmits a list of push policies it supports.

As illustrated, a first step is directed to the transmission by client 1100 of a list of push policies it supports in initial request 1119 for the streaming manifest (MPD in case of DASH). Such a list is preferably ordered (preference order, not represented in FIG. 11c).

To that end, a dedicated HTTP push header is created to convey the type of the policy and the optional parameter for preference order. For example, the dedicated HTTP push header is defined as "Accept-Push-Policy" HTTP header similarly to the existing Accept HTTP header (see: https://tools.ietf.org/html/rfc7231#section-5.3.2).

The Accept header allows for a given media-type to have:
0*(zero or more) specific media-type parameters (e.g.: charset); this can be for example a list of media types supported by the client issuing the request: *.jpg, *.png
0-1 "q" parameter (for indicating relative weight)
0*extension parameters (the "q" parameter is mandatory as a separator if any extension parameter is present).

This would lead for the dedicated HTTP push header to:
Accept-Push-Policy: <urn>[';'<urn-specific-param>*]; q=<N>
where the "q" parameter is mandatory if there are some global parameters.

The "q" parameter is a quality factor that also separates the policy parameter(s), the <urn-specific-param> in the above expression, if any, from the policy types (indicated by the <urn> in the above expression).

Quality factors allow the user or the user agent to indicate the relative degree of preference for the policy type and/or policy value, using the q value scale from 0 to 1. The default value is q=1 (higher quality factor or preferred one).

For the sake of illustration, the client can ask the server to push the next five segments consecutive to one requested segment using the following notification in the push header:
Accept-Push-Policy: urn:mpeg:dash:fdh:push-next; 5
where the first part, a URN, uniquely identifies the type of the push directive or the push policy to use. The second parameter (optional), following the ';' separator corresponds to the parameter to apply in this push policy.

As an alternative, other separators between the policy type and the value parameter can be used as separator in a HTTP header value (see RFC 2616).

An alternative embodiment allowing the client to indicate an ordered list of push policies according to its preference is to use the "q" parameter, for example in a live scenario to indicate the server to push some next segments (a standard push policy registered according to reference 1230 in FIG. 12b) as soon as they are ready on the server, preferably 3 segments, otherwise 5 segments, can be expressed as follows:
Accept-Push-Policy: urn:mpeg:dash:fdh:push-next;3, urn:mpeg:dash:fdh:push-next;5; q=0.5

As another example according to which the client indicates a push policy to enable a fast start (here from a proprietary push policy, possibly also registered according to 1230 in FIG. 12b) of the video (i.e. from MPD request, to push the initialization and first video segments), with as preference order a quality level, an ordered list of push policies can be expressed as follows:

Accept-Push-Policy: urn:canon:dash:fdh:push-fast-start; high,
        urn:canon:dash:fdh:push-fast-start;mid; q=0.7,
        urn:canon:dash:fdh:push-fast-start;low; q=0.3 or by preference for a resolution:

Accept-Push-Policy: urn:canon:dash:fdh:push-fast-start; HD,
        urn:canon:dash:fdh:push-fast-start;SD; q=0.7

For a client to indicate to the server to push various kinds of data, it can place in the request the indication for two different push policies with the same value for q. This should be interpreted by the server as two policies to be applied in response to that request.

If the server can apply both, it acknowledges the client suggestion by putting in its response, in a dedicated HTTP push header, these two push policies with the same q value.

On the contrary, if only one of the two can be applied, it acknowledges the client suggestion with the used push policy as value for the dedicated HTTP push header.

If none of the two suggested push policies can be applied, the server then acknowledges the client's suggestion by adding the identifier of the no push policy (for example the registered value 1231, or any push policy type specifically defined for this purpose) in the dedicated HTTP push header.

Returning to FIG. 11c, server 1101 processes the received request 1119, that may be directed to a fast start, in step 1120.

In response to that request, server 1101 prepares its response at step 1121 with the return code for the initial request. Accordingly, if the requested resource is available, the return code is the HTTP code 200.

In addition, server 1101 acknowledges one of the push policies suggested by client 1100 by using the same Accept-Push-Policy dedicated HTTP push header, potentially reconsidering the order to match its own preferences (in such case, the first one is the one used to announce the next data it will push), or preferably by using another dedicated HTTP push header conveying only the actual push policy from the list that it will use.

For example, such a dedicated HTTP push header can be "DASH-PUSH": urn:canon:dash:fdh:push-fast-start;low (wherein the name of the header ("DASH-PUSH") is given as an example) or only the type of the policy without providing the exact value of the parameter, for example "DASH-PUSH": urn:canon:dash:fdh:push-fast-start (letting in this case the server selecting the version of the media to push).

Such acknowledgment data are received by client 1100 at step 1122.

In parallel, server 1101 starts preparing the data streams used to send the announced additional data to the client (step 1123) and sends the corresponding data.

The next requests sent by client 1100 after reception of the pushed data (step 1124) may again include a push policy indication, for example the preferred one acknowledged by the server.

In the case according to which server 1101 does not support any of the suggested push policies received within the MPD request (step 1120), it can acknowledge the suggestion of the client by setting the dedicated HTTP push header to the "no-push" policy (for example through the registered URN referenced 1231 in FIG. 12b, urn:mpeg: dash:fdh:push-none, or any push policy type specifically defined for that purpose).

Figure 11D:
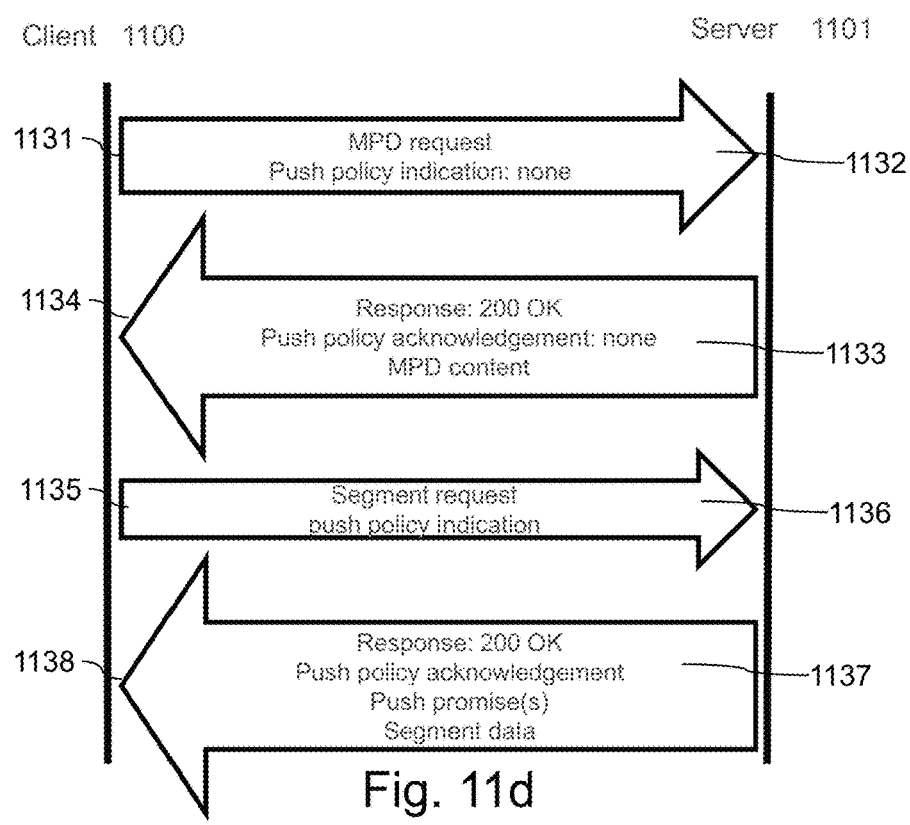

FIG. 11d illustrates an example of acknowledging a push policy notification, according to which the client suggests a "no push" policy in the initial request for a streaming manifest. In other words, FIG. 11d illustrates a case according to which the client would like to keep the control on the Representation selection at the beginning.

As illustrated, a first step is directed to the transmission by client 1100 of the "no push" policy indication in initial request 1131 for the streaming manifest (MPD in case of DASH).

Accordingly, initial request 1131 clearly indicates that the client does not want the server to push anything. For the sake of illustration, such a "no push" policy may be the following: urn:mpeg:dash:fdh:push-none, as registered in reference 1230 in FIG. 12b.

Such an example corresponds to the case according to which the client is not interested by a fast start, at the beginning of the session, and thus, prevents any push from the server (by default an HTTP/2 server may take initiative on push with the risk of sending something not relevant to the client).

As illustrated in FIG. 11d, server 1101 acknowledges this no-push policy in its response referenced 1133.

For requesting segments, client analyzes the MPD (step 1134) to better know what it is going to ask and, as a consequence of that analysis, suggests the server one or several push policies (step 1135).

In response, server 1101 acknowledges a push policy as described by reference to FIG. 11a or to FIG. 11c so as to push the promised data (not represented).

Naturally, the push policy for fast start of the streaming session can be used for other purposes. For example, the client indicates a push policy at MPD request time (step 1131), then the server acknowledges positively or negatively (as described previously by reference to FIG. 11a or to FIG. 11c) and eventually promises to push the first segments to the client. Then, for consecutive requests on segments, the client can decide whether it trusts the server to keep on pushing by indicating the push policy of its choice or whether it wants to keep the full control on the transmission by using the specific "no-push" policy.

It is to be noted that whatever the push policy indicated by the client, if the server cannot handles any push policy suggested by the client and/or cannot process the corresponding specific HTTP header (e.g. test 604 in FIG. 6a is false), it cannot send any acknowledgment of any kind and thus, would simply ignore the hint from the client.

At the opposite, a DASH server configured to handle push policies (or directives) suggested by a client and deciding to apply it should acknowledge the client request by using in its response the URN of the push policy (or directive) with accepted parameter values if any. In case of multiple push policies indicated by the client and server supporting one of the push policies of a list of push policies suggested by the client, should acknowledge the push policy it plans to use by putting in the dedicated HTTP push header the URN of the applied push policy.

Figure 11E:
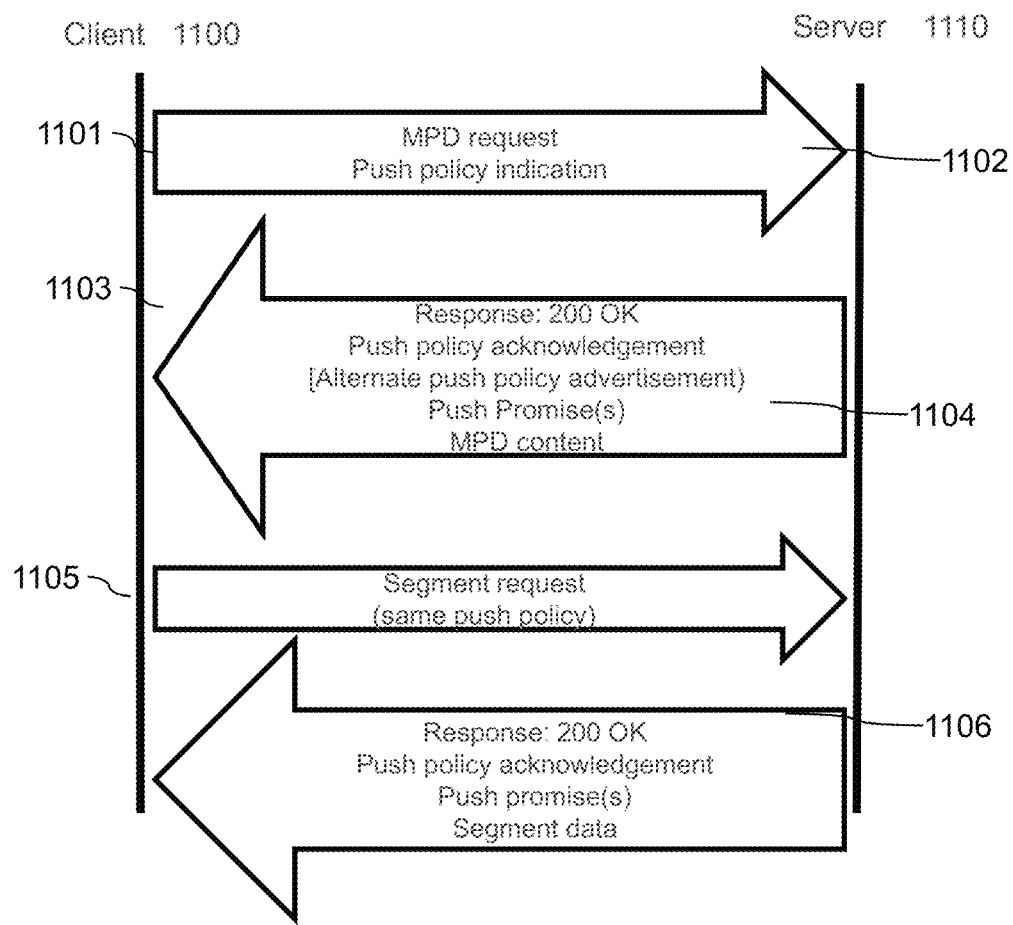

Optionally, the server may also advertise a list of alternative push policies it implements in various ways as explained below and as illustrated in FIG. 11e.

In case the server does not support the push policy suggested by the client, it should inform the client by using the URL for the "no-push" strategy, i.e urn:mpeg:dash:fdh: push-none. In addition to the acknowledgement with the "no-push" policy, it can publish in another dedicated HTTP push header one push policy or a list of push policies it supports. To disambiguate from the acknowledgement response, the server preferably uses another dedicated HTTP push header. It can use, depending on whether it publishes one push policy or a list of push policies the syntax given in the Accept-Push-Policy header.

It is to be noted that when a push policy is addressed to a non-push capable server (i.e. a server that does not understand any push policy from any client, e.g. test 604 in FIG. 6a is false), there would be no acknowledgment of any kind and no advertising of any push policy could be signaled to the client.

In order to help a client to suggest a push policy, a server can transmit to the client a list of the push policies that it supports. This can be done in a number of ways.

For the sake of example, a list of the push policies that are supported by a server can be determined at the time of creating content in the MPD and added to the latter as one or several DASH descriptors. They provide an indication of the supported push policies by the origin server or by the servers in the Content Delivery Network.

This can also be done by the networks intermediaries if they are DASH aware.

Such a descriptor can be identified by a specific scheme_id_uri attribute (for example "urn:mpeg:dash:fdh:pushDirective"). The value attribute for such descriptor contains the type of the push policy (for example: "urn:mpeg:dash:fdh:push-next" or "urn:mpeg:dash:fdh:push-none").

Optionally, other attribute (ex: param) can contain policy parameters like the number of next segments to push. This would be written: <SupplementalProperty scheme_id_uri="urn:mpeg:dash:fdh:pushDirective" value="urn:mpeg:dash:fdh:push-next" param="5"/>. The values for scheme_id_uri and value attributes are assumed defined by DASH standard or at least by a registration authority like in 1230. This can be for example DASH through scheme_id_uris, DASH industry forum, or IANA with associated guidelines on client and server behavior to take benefit of the corresponding push strategy.

According to another example, a specific HTTP header field, e.g. "Supported-Push-Policies", can be used to describe the push policies supported by the server. In a basic implementation, the value of this header field is the comma-separated list of the identifiers of the supported push policies.

Such a specific HTTP header field can be, for example, the following:
    Supported-Push-Policies: urn:dash:adobe:k-push, urn:dash:canon:fast-start In a richer implementation, the parameter values supported for each policy could be described, either as a "," separated list, or as a range.

Such a specific HTTP header field can be, for example (using ';' as separator between the policy type and its parameters), the following:
    Supported-Push-Policies: urn:dash:adobe:k-push;0-100, urn:dash:canon:fast-start;low:medium The server could also indicate its preferences for each policy by adding a "q" parameter for each policy.

Such a specific HTTP header field can be, for example, the following:
    Supported-Push-Policies: urn:dash:adobe:k-push;0-100; q=0.4, urn:dash:canon:fast-start;low:medium;q=0.9

In application code, for example in a Web page, a HTML meta tag could list some policies that client could use to improve the transmission.

Such a HTML meta tag can be, for example, the following:

<meta name=«dash:fdh:pushDirective»content=«urn : one_push_directive_ID»/> where the new "dash:fdh:pushDirective" value allowed in the name attribute could be registered into the existing extension list: https://wiki.whatwq.org/wiki/MetaExtensions. Such a registration enables a Web client to be informed that the application server has thought of strategies to optimize the media delivery, media being embedded in the Web page, for example as a <video> element. The values to put in the content attribute can be one of the registered values referenced 1230 in FIG. 12b.

Figure 8:
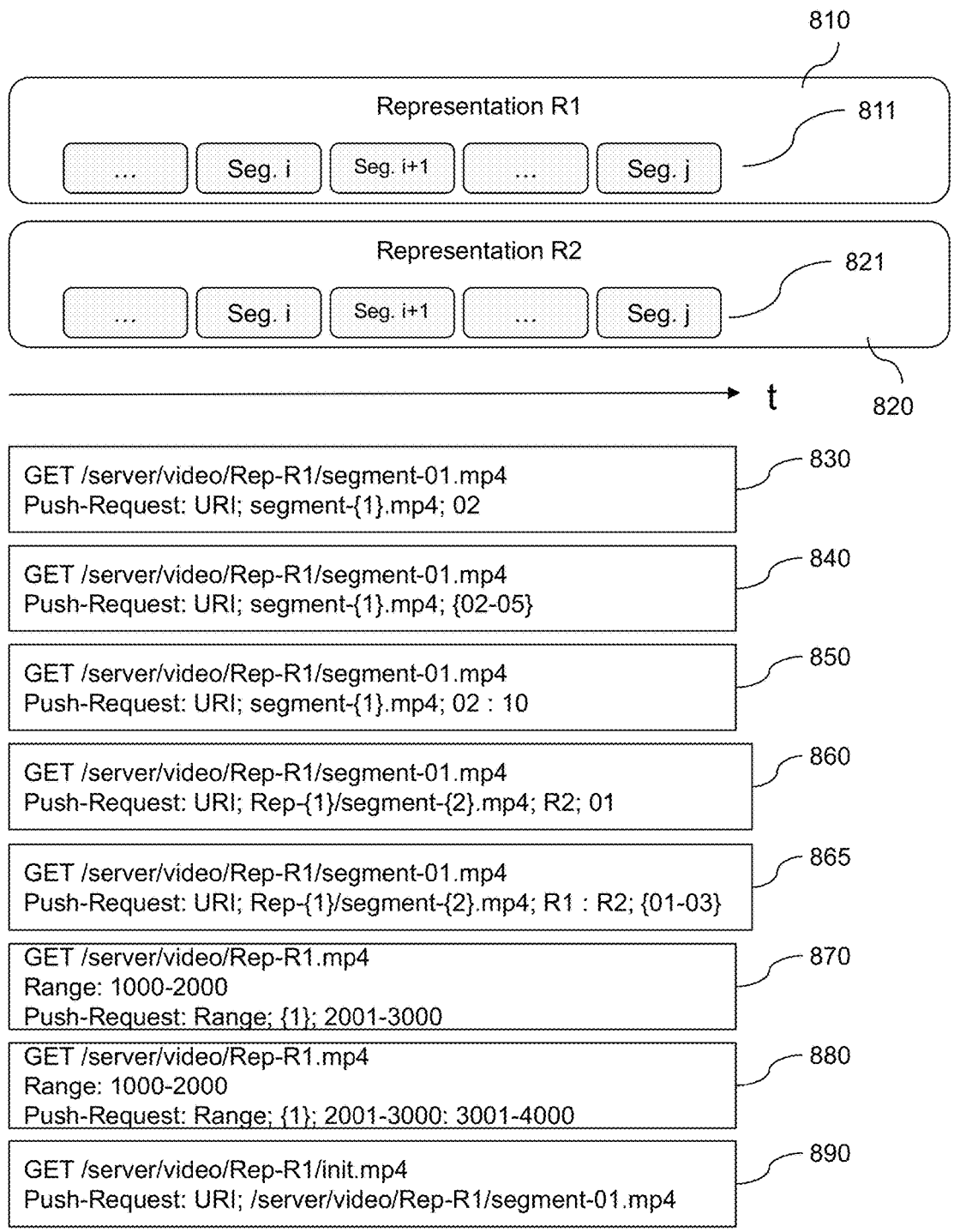
FIG. 8 illustrates examples of push headers according to the invention, in the context of DASH streaming.

FIG. 8 provides various examples of push headers for the case of adaptive streaming with DASH. A media (video) is available as two distinct representations R1 810 and R2 820, both containing temporally aligned video segments 811 and 821.

First example 830 illustrates a client's request for the first segment of representation R1. The request also indicates, through the push header "Push-Request" that the client is interested in segment number 2 as future segment. To do so, the push specific header indicates that the server has to modify the curly-bracketed pattern of the request-URI (indicated by the first parameter of the header: "URI"), i.e. string of characters "01" in the request-URI, with the values provided in the last parameter ("02" in example 830). An alternative could have been to indicate a substitution rule via a regular expression like: Push-Request: URI; -\(\d\+\), -\(% 02d:\1+1\).

Second example 840 illustrates a client's request for the first segment of representation R1. The request also indicates, through the push header "Push-Request" that the client is interested in the segments number 02, 03, 04 and 05 as future segments. This list of future segments is expressed here as a range for compactness and simplicity purpose. Again, the pattern between curly brackets has to be iteratively replaced in the initial request-URI by the values set in the provided range, so as to build the corresponding list of four URLs.

Third example 850 illustrates a client's request for the first segment of representation R1. The request also indicates, through the push header "Push-Request" that the client is interested in segment number 02 and 10, as future segments. Interest in segment number may allow the client to fast browsing the video. Then, the substitution values are given as a list of values separated by a colon. In case more segments (No 02 to 04 and 10 to 13) would be of interest for the client, these could have been signaled through a list of ranges as follows:
    Push-Request: URI; segment-(1).mp4; {02-04}: {10-13}

Fourth example 860 illustrates a client's request for the first segment of representation R1. The request also indicates, through the push header "Push-Request" that the client is interested in segment number 01 but in Representation R2, as future segment. This can be useful for scalable video when Representation R2 is an enhanced version of base version R1. This example illustrates the variation on multiple patterns in the request-URI indicated by the presence of two patterns (between curly brackets) to substitute in the request-URI.

Fifth example 865 illustrates a client's request for the first segment of representation R1. The request also indicates, through the push header "Push-Request" that the client is interested first in segment number 01 in Representation R2 and in segment 02 in both Representations R1 and then R2 and finally in segments 03 in both Representations "R1" and "R2", as future segments. This is indicated by the presence of two patterns (between curly brackets), each indicating the order of substitutions. In this example, the representation identifier with the first set of values "R1" and "R2" is first considered, and then the segment index with the values in the range 01 to 03 included is considered.

It has to be noted that for the special case of iterating over multiple parameters (segments 01 to 03 on each of the two representations), the first segment in representation R1 is provided twice (once as the requested first segment—see request-URI; and once as pushed data). Therefore, the server can filter the obtained list of URLs to delete the URL corresponding to the initial request-URI.

Sixth and seventh examples 870 and 880 illustrate the header use when media segments are addressed through byte ranges, for example in a MPD with media segments being described as a SegmentBase element containing SegmentURLs that provide the segments' byte ranges.

Example 870 illustrates a client's Range request for the first bytes of representation R1. The request also indicates, through the push header "Push-Request" that the client is interested in the byte range starting at 2001 and ending at 3000 byte offset in the "Rep-R1.mp4" file, as future parts of the resource.

Seventh example 880 illustrates a client's Range request for the first bytes of representation R1. The request also indicates, through the push header "Push-Request" that the client is interested in a list of byte ranges, first from 2001 to 3000 included and then from 3001 to 4000 included in the "Rep-R1.mp4" file, as future parts of the resource.

Eighth and last example 890 of FIG. 8 illustrates a client's request for the initialization segment. The request also indicates, through the push header "Push-Request" that the client is interested in a given segment, as future segment: here the explicit and absolute URI is provided, without pattern identification nor substitution values.

The description above mainly concentrates on specific push headers that define specific resources to be pushed, possibly through a construction rule.

In some embodiment where the server contains a static configuration file mapping resource types to resource folder, the client may use the specific push header to filter resources of interest for the client. Such filtering may for instance take place during step 606 described above.

This filtering approach can be useful when the client indicates in the specific push header a kind of resources rather than specific resources or at least rules to identify these specific resources.

Alternatives exist like, for example the use of unique identifiers (e.g. URNs) to unambiguously designate push policies or push directives, as described by reference to FIGS. 12a and 12b.

FIG. 12a illustrates the transmission by client 1200 of an indication of a push policy in initial request 1201 for the streaming manifest (MPD in case of DASH), the indication being a unique identifier associated with the push policy. As described previously, this indication can be conveyed via a dedicated HTTP push header.

Upon reception, server 1210 processes the request at step 1203, i.e. the server identifies the resource (MPD) to be provided to client 1200. Then, server 1210 prepares its response with the return code for the initial request. Accordingly, if the requested resource is available, the return code is the HTTP code 200.

In parallel, server 1210 identifies the suggested push policy as a function of the unique identifier contained in the dedicated HTTP push header. If the server can understand the header and if it can handle the suggested push policy, it then acknowledges the push policy suggested by the client. This can be done by adding the unique identifier in response 1204.

This indicates to the client that the server is willing to use the suggested push policy.

The unique identifiers associated with push policies can be defined in centralized registry, for example centralized registry 1230 illustrated in FIG. 12b. The URN allows unique identification of a push policy (or directive). When the push policy (or directive) requires parameters, these must be defined in a specification linked from the above registry, so that the push policy is clearly specified.

If no centralized registry is defined, then the dedicated HTTP push header can convey the type of the push policy (for example a number of segments to be pushed, a duration during which segments should be pushed, or an indication for pushing MPD updates).

For the sake of illustration, the type of the push policy that can be conveyed in the dedicated HTTP push header can be the followings ("Push-Request" being, in this example, the name of the dedicated HTTP push header):

Push-Request: push-next
Push-Request: push-time
Push-Request: fast-start
Push-Request: mpd-update Optionally, the dedicated HTTP push header can convey the type of the push policy and parameters for the suggested push policy (for example the number of segments and the duration to push (in seconds)). Accordingly, the type of the push policy that can be conveyed in the dedicated HTTP push header and the associated parameters can be the followings (using here ';' as separator between policy type and parameters):

Push-Request: push-next; 5
Push-Request: push-time; 2
Push-Request: fast-start; 2
Push-Request: mpd-update; patch
Push-Request: push-next;

More generally the dedicated HTTP push header can be expressed as:

Push-Request: URN*[';'<urn-specific-params>]

The last example is specific and aims at indicating the server to keep on pushing from a given segment, all the following ones (i.e. a kind of switch from client to server driven mode).

It is to be noted that for some policy types associated with few possible values it may advantageous to register the type plus parameter as one URN, for example:

urn:mpeg:dash:fdh:2015:push-next-*
or
urn:mpeg:dash:fdh:2015:push-time-2.

According to particular embodiments, an option is given to the client to clearly express its wishes in terms of data to push so as to suggest push policies as a function of the type of data to push. Accordingly, a user can define a set for push strategies related to segments and another set for push strategies related to MPD updates, as illustrated in centralized registry 1230 in FIG. 12b.

Such embodiments may prove to be useful to have specific MPD update push policies, this in order for the client to automatize the update process. Indeed, suggesting and acknowledging pushing MPD updates make it possible to avoid adding a special metadata box in the media segments to indicate the MPD expiration date (typically done by the server when the MPD is updated).

For example, a push policy for MPD update acknowledged at some point in time during the streaming session would inform the client that server is promising to push a MPD update.

Moreover having different kinds of MPD update push policies could allow a client to be informed whether server resends the whole MPD (for example with the URN: urn:mpeg:dash:fdh:push-mpd-full) or only a patch (urn:mpeg:dash:fdh:push-mpd-patch). Alternatively, only one push policy for a MPD update can be defined, the full or patch mode becoming a parameter.

FIGS. 11a to 11e illustrate the use of these two kinds of push policies. As described by reference to FIGS. 11a to 11e, the client starts by requesting an MPD. In the meantime, it can indicate interest for pushing of both MPD updates and segments or for only one of these two kinds of data. Similarly, when preparing requests for a segment, it can indicate interest for both MPD update and segments or for only one of these two kinds of data.

Indeed, the use of MPD-specific policies should be allowed in requests for segments to indicate at any time a wish for MPD updates. Likewise, using segment-related push policies when requesting the MPD allows the client to have a fast start streaming session.

It is to be noted that the given examples directed to streaming applications are based on HTTP/2 protocol for the sake of illustration but other bi-directional protocols such as WebSocket can also be used. In particular, the dedicated HTTP push header can be replaced in a binding for WebSocket as follows:

URL: indicates the URL of the requested resource. The corresponding JSON parameter is "url".

PushDirective: indicates the URN of the client-selected PushDirective and has the JSON name "PushDirective".

Optional pushParams that indicate values which are specific to and defined by the pushDirective.

Likewise, the acknowledgment mechanism can use JSON parameters in some dedicated WebSocket frames.

For example, the server can host data in different folders. Then, assuming 'path' is the path on server to reach the main resource, 'path/image' would contain image resources, 'path/code' would contain codes for instance javascript code, 'path/style' would contain css resources, and so on. In such context, when a client indicates in the specific push header that it would like all kinds of images declared in a Web page (image/*) or all images of a given type (image/*.jpg), the configuration file on the server should then list for any resource directory the list of images that can be pushed.

The Web page may be the data requested in the request-URI of the request. In a variant, the Web page may be identified using another optional header in the request.

According to the filtering approach, the invention provides a method of transmitting data between a server device and a client device, comprising the following steps, at the server device:

receiving, from the client device, an HTTP request to obtain first data, wherein the HTTP request includes a first optional header field comprising one or more filtering parameters;

retrieving and sending the first data to the client device; and if the first optional header field is present in the HTTP request:

identifying a set of data using a main resource obtained from the HTTP request;

filtering each data of the identified set, using the one or more filtering parameters to obtain a list of second data; and pushing the second data to the client device.

From the client's perspective, the invention provides a method of transmitting data between a server device and a client device, comprising the following steps, at the client device:

generating an HTTP request to obtain first data, wherein the HTTP request includes a first optional header field comprising one or more filtering parameters;

sending the HTTP request to the server device to obtain the first data and to drive the server device to push, according to the filtering parameters, second data referenced in a main resource inferred from the HTTP request.

Some examples of use of the push specific header as a filtering approach are now described.

A first example concerns web page loading when the client wants to indicate to the server a prioritized list of sub-resources to be pushed according to their type, for instance to load jss and css and then html and img. The web page, called the main resource, is the requested one defined in request-URI of the request. The specific push header may be defined as follows:

Push-Request: application/javascript;q=1, text/css;q=0.8, text/html;q=0.7, image/png;q=0.6, image/*;q=0.4

This is an indication to the server that client would like a set of resources (for example the sub-resources declared in the main resource) to be pushed according to their type (for example their MIME type, content type, format type or codec type).

Here, a priority level is provided to each resource type using a 'q' parameter in a similar way to the 'q' parameter of Accept header which indicates relative degree of preference by the client. Note that q=0 makes it possible to exclude some resource types from being pushed by the server.

In this example, the priorities 'q' make it possible to define a client-preferred order or version (for example according to a preferred resolution) in which the sub-resources have to be pushed by the server. As a consequence, the server has to filter the sub-resources so as to provide an ordered list of data for pushing.

A second example concerns image loading for a web page, when the web page is not the requested data defined in the request-URI of the request. In such situation, the support part of the specific push header explicitly indicates the HTTP "Referer" header. This is an indication for the server that additional resources wished by the client are sub-resources of the main resource indicated in the Referer header's value. Optionally, the headers below drive the loading of all images of the web page indicated in the "Referer" HTTP header, with a priority for the images in the .png image format:

Push-Request: Referer; image/png;q=0.6, image/*;q=0.4
Referer: the_url_to-web-page A third example concerns DASH streaming, and more particularly MPD loading and fast start. The push header may be as follows, where the MPD is the requested data defined in request-URI of the request:

Push-Request: video/mp4;q=1, video/webm;q=0.4

This indicates a preference from the client to start with media segments with "video/mp4" MIME type rather than with segments having "video/webm" MIME type. An equivalent example could be to write:

Push-Request: URI; video.{1}; {video/*.mp4;q=1, video/webm;q=0.4}

In the above example, based on the URI for the main resource, i.e. the MPD, the server can deduce all video segments in mp4 format to push to the client. With this wildcard substitution values, it is up to the server, for example based on static configuration information for the given manifest or from MPD analysis, to determine the list of segments to push.

More generally, this can be useful for example when a client downloading a piece of javascript code or a CSS sub-resource, declares, in a Web page and to indicate the server, that it would also like to obtain, for the same request, the sub-resources referenced respectively in the javascript code and in the CSS sub-resource.

A fourth example concerns video streaming, and more particularly seeking in byte ranges. If a media content subpart is requested using a SegmentBase URL and a byte range in the HTTP request, the following push header in the same request makes it possible to drive the push of byte range [1400-4000] and then with lower priority of byte range [4000-6000]:

Push-Request: Range; {1}; [1400-4000];q=1: [4000-6000];q=0.8

A fifth example describes, for DASH application, a set of resources to be pushed as pertaining to a main resource, i.e. the manifest. This is indicated through the support part of the specific push header having the value "Referer". The pattern part indicates a set of video resources and the wildcard substitution values indicate a filtering rule based on the type of video segments, here mp4:

Push-Request: Referer; video.{1}; video/*.mp4
Referer: the_url_to-MPD

This allows client to use wildcard values in the specific push header.

The Referer header is optional but in case of intelligent server (MPD aware), its value can help the server to filter the sets of segments (or more generally (sub-)resources) indicated by the clients.

Figure 9:
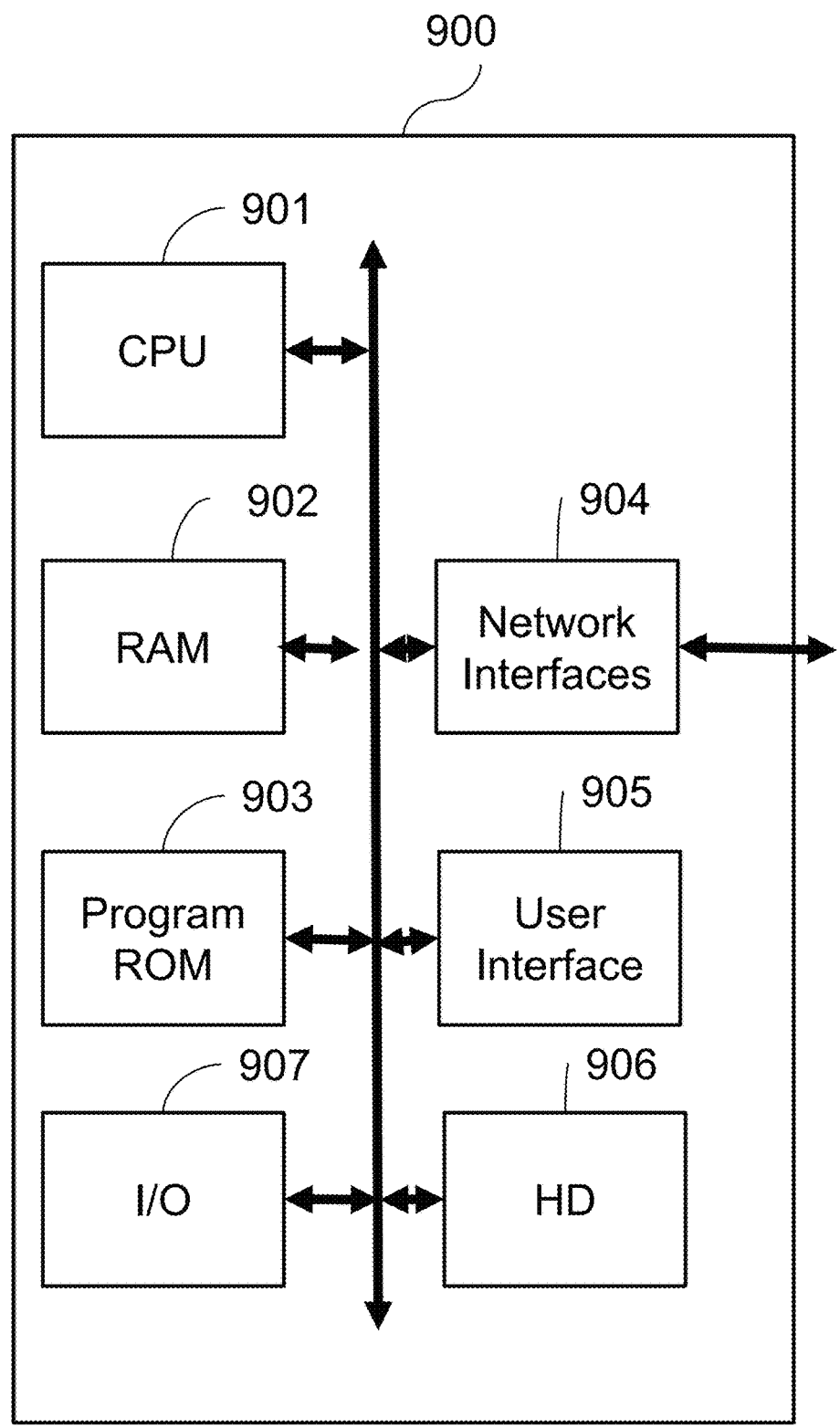
FIG. 9 is a schematic illustration of devices according to embodiments.

FIG. 9 is a schematic illustration of a device according to embodiments. The device may be a server, a client or a proxy. The device comprises a RAM memory 902 which may be used as a working memory for a control unit 901 configured for implementing a method according to embodiments. For example, the control unit may be configured to execute instructions of a computer program loaded from a ROM memory 903. The program may also be loaded from a hard drive 906.

The device also comprises a network interface 904 which may be a single network interface, or comprise a set of network interfaces (for instance several wireless interfaces, or several types of wired or wireless interfaces). The device may comprise a user interface 905 for displaying information to a user and for receiving inputs from the user.

The device may also comprise an input/output module 907 for receiving and/or sending data from/to external devices.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of communication between a server device and a client device, comprising the following steps, at the server device:
   receiving, from the client device, an HTTP request to obtain first data, wherein the HTTP request includes first data identifying information allowing identification of the first data on the server device and includes one or more additional header fields containing information for identifying second data other than the first data requested by the HTTP request, wherein the information for identifying second data allows the server device to determine whether the client device is to receive the second data;
   sending the first data to the client device in response to the HTTP request received from the client device;
   determining the second data on the server device, using only the one or more additional header fields, the second data being related to the first data according to a reference file; and
   pushing, to the client device, using the push feature of HTTP/2, the second data so determined using the one or more additional header fields contained in the HTTP request received from the client device to obtain the first data.

2. The method of claim 1, further comprising:
   sending a push promise message to announce the push of the second data to the client device and/or pushing the second data to the client device.

3. The method of claim 1, further comprising:
   sending acknowledgment data to the client device before pushing the second data, the acknowledgement data being representative of second data identifying information used to determine the second data to be pushed to the client device.

4. The method of claim 3, wherein the acknowledgement data are representative of a push policy driving the push of the second data.

5. The method of claim 3, wherein the second data identifying information within the HTTP request comprises a list including at least two different push policies driving different ways of pushing second data.

6. The method of claim 3, wherein the acknowledgment data contain second data identifying information being different from the second data identifying information within the HTTP request.

7. The method of claim 4, wherein the acknowledgment data comprise one of the at least two different push policies for pushing second data, the one of the at least two different push policies for pushing second data being used to identify the second data to be pushed to the client device.

8. The method of claim 1, wherein the second data identifying information is associated with a type of data of the second data, the type of data comprising a description data type or a content data type, the second data belonging to content data or to description data.

9. The method according to claim 1, wherein the second data identifying information within the HTTP request comprises at least one unique identifier, the at least one unique identifier being representative of directives for pushing second data and of identification of the second data to be pushed or being representative of directives for not pushing second data.

10. The method according to claim 1, wherein the one or more additional header fields are one or more optional header fields.

11. The method according to claim 1, wherein the first and second data identifying information within the HTTP request include first and second uniform resource identifiers, URIs, respectively.

12. The method according to claim 11, wherein the one or more optional header fields include at least one construction rule to generate the second URI from the content of the HTTP request.

13. The method according to claim 11, wherein the one or more optional header fields include varying-part information and substitution information, the varying-part information identifying at least one varying subpart in a reference URI and the substitution information including at least one substituting value to replace the varying subpart identified in the reference URI to define the second URI or URIs.

14. The method of claim 1, wherein the second data identifying information for identifying the second data is determined in the determining step by using the one or more additional header fields contained in the HTTP request from the client device.

15. A non-transitory computer-readable storage medium storing instructions of a computer program which, when loaded and executed by a microprocessor or computer system in a device, causes the device to carry out the method according to claim 1.

16. A method of communication between a server device and a client device, comprising the following steps, at the client device:
    identifying first data to be requested to the server device;
    generating an HTTP request to obtain the first data, wherein the HTTP request includes first data identifying information to be used by the server device to identify the first data on the server device and includes one or more additional header fields containing an information item for the server device related to whether to push, using the push feature of HTTP/2, data related to the first data according to a reference file or not to push the data, wherein the information item allows the server device to determine whether the client device is to receive the data related to the first data;
    sending the HTTP request to the server device to obtain the first data, the HTTP request including the one or more additional header fields containing the information item related to whether to push data or not to push data; and
    in response to sending the HTTP request, receiving the first data from the server device.

17. A non-transitory computer-readable storage medium storing instructions of a computer program which, when loaded and executed by a microprocessor or computer system in a device, causes the device to carry out the method according to claim 16.

18. A method of communication between a server device and a client device, comprising the following steps, at the client device:
    generating an HTTP request to obtain first data, wherein the HTTP request includes a first optional header field comprising one or more filtering parameters, wherein the one or more filtering parameters allows the server device to determine whether the client device is to receive second data;
    sending the HTTP request including the first optional header field, to the server device to obtain the first data and to drive the server device to push, according to the filtering parameters and using the push feature of HTTP/2, the second data referenced in the first data obtained based on the HTTP request.

19. The method of claim 18, wherein the one or more filtering parameters:
    define a resource type; and the resource type or types include one or more types from an application type, a text type, an image type, a video type, an audio type; or
    identify one or more groups of data using identifiers of elements in a DASH media presentation description; or
    are defined in the first optional header field using time ranges identifying subpart of the first data to be obtained based on the HTTP request.

20. A non-transitory computer-readable storage medium storing instructions of a computer program which, when loaded and executed by a microprocessor or computer system in a device, causes the device to carry out the method according to claim 18.

21. A server device for communicating with a client device, the server device comprising:
    a receiving unit for receiving from the client device, an HTTP request to obtain first data, wherein the HTTP request includes first data identifying information allowing identification of the first data on the service device and includes one or more additional header fields containing information for identifying second data other than the first data requested by the HTTP request, wherein the information for identifying second data allows the server device to determine whether the client device is to receive the second data;
    a sending unit for sending the first data to the client device in response to the HTTP request received from the client device;
    a determining unit for determining the second data on the server device, using the one or more additional header fields, the second data being related to the first data according to a reference file; and
    a pushing unit for pushing to the client device, using the push feature of HTTP/2, the second data so determined using the one or more additional header fields contained in the HTTP request received from the client device to obtain the first data.

22. A client device for communicating with a server device, the client device comprising:
    an identifying unit for identifying first data to be requested to the server device;
    a generating unit for generating an HTTP request to obtain the first data, wherein the HTTP request includes first data identifying information to be used by the server device to identify the first data on the server device and includes one or more additional header fields containing an information item for the server device related to whether to push, using the push feature of HTTP/2, data related to the first data according to a reference file or not to push the data, wherein the information item allows the server device to determine whether the client device is to receive the data related to the first data;
    a sending unit for sending the HTTP request to the server device to obtain the first data, the HTTP request including the one or more additional header fields containing the information item related to whether to push data or not to push data; and
    in response to sending the HTTP request, receiving the first data from the server device.

23. A client device for communicating with a server device, the client device comprising:
   a generating unit for generating an HTTP request to obtain first data, wherein the HTTP request includes a first optional header field comprising one or more filtering parameters, wherein the one or more filtering parameters allows the server device to determine whether the client device is to receive second data;
   a sending unit for sending the HTTP request including the first optional header field, to the server device to obtain the first data and to drive the server device to push, according to the filtering parameters and using the push feature of HTTP/2, the second data referenced in the first data obtained based on the HTTP request.

* * * * *